US012739800B2

(12) United States Patent
Davydov et al.

(10) Patent No.: US 12,739,800 B2
(45) Date of Patent: Sep. 15, 2026

(54) MULTI-SLOT PDCCH MONITORING IN CONFIGURED SEARCH-SPACE SETS

(71) Applicant: Intel Corporation, Santa Clara, CA (US)

(72) Inventors: Alexei Davydov, Nizhny Novgorod (RU); Daewon Lee, Portland, OR (US); Yingyang Li, Beijing (CN); Yi Wang, Beijing (CN); Gang Xiong, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 231 days.

(21) Appl. No.: 18/290,339

(22) PCT Filed: Mar. 21, 2022

(86) PCT No.: PCT/US2022/021189
§ 371 (c)(1),
(2) Date: Nov. 13, 2023

(87) PCT Pub. No.: WO2023/014405
PCT Pub. Date: Feb. 9, 2023

(65) Prior Publication Data

US 2024/0260010 A1 Aug. 1, 2024

Related U.S. Application Data

(60) Provisional application No. 63/275,388, filed on Nov. 3, 2021, provisional application No. 63/256,418, filed
(Continued)

(51) Int. Cl.
*H04W 72/0446* (2023.01)
*H04L 5/00* (2006.01)
(Continued)

(52) U.S. Cl.
CPC ....... *H04W 72/0446* (2013.01); *H04L 5/0094* (2013.01); *H04W 72/231* (2023.01); *H04W 72/232* (2023.01)

(58) Field of Classification Search
None
See application file for complete search history.

(56) References Cited

U.S. PATENT DOCUMENTS 10,721,722 B2 * 7/2020 Sun ........................ H04W 74/00
10,939,427 B2 * 3/2021 Yang ..................... H04W 72/23
(Continued)

FOREIGN PATENT DOCUMENTS

WO WO-2023014405 A1 2/2023

OTHER PUBLICATIONS

"International Application Serial No. PCT/US2022/021189, International Search Report mailed Jun. 22, 2022", 4 pgs.
(Continued)

*Primary Examiner* — Marcus Smith
*Assistant Examiner* — Francesca Lima Santos
(74) *Attorney, Agent, or Firm* — Schwegman & Lundberg & Woessner, P.A.

(57) ABSTRACT

A user equipment (UE) configured for multi-slot physical downlink control channel (PDCCH) monitoring may decode higher-layer signalling comprising configuration information received from a gNodeB (gNB) that configure the UE with search space (SS) sets for multi-slot PDCCH monitoring. At least some slots of the SS sets may be indicated to have a PDCCH monitoring occasion (MO). A SS set may be configured in a number (Y) of consecutive non-overlapping slots (MO slots) within slot groups of a number (X) of consecutive non-overlapping slots. The number (X) of consecutive slots of the slot group may be at least twice the number (Y) of consecutive MO slots within each SS set. The
(Continued)

number (X) of consecutive slots of the slot group and the number (Y) of consecutive MO slots within each SS set that comprise the PDCCH MO may also be based on a subcarrier spacing (SCS).

17 Claims, 16 Drawing Sheets

Related U.S. Application Data on Oct. 15, 2021, provisional application No. 63/229,012, filed on Aug. 3, 2021.

(51) Int. Cl.

| | |
|---|---|
| ***H04W 72/231*** | (2023.01) |
| ***H04W 72/232*** | (2023.01) |

(56) References Cited

U.S. PATENT DOCUMENTS

| | | | | |
|---|---|---|---|---|
| 2020/0314817 | A1* | 10/2020 | Sun | H04W 72/23 |
| 2020/0322936 | A1 | 10/2020 | Sun et al. | |
| 2020/0329461 | A1 | 10/2020 | Yang et al. | |
| 2022/0046744 | A1* | 2/2022 | Bao | H04W 52/0216 |

OTHER PUBLICATIONS

"International Application Serial No. PCT/US2022/021189, Written Opinion mailed Jun. 22, 2022", 4 pgs.
Huawei, et al., "Enhancement on PDCCH monitoring", R1-2102328, 3GPP TSG RAN WG1 Meeting #104bis-e, E-meeting, (Apr. 7, 2021), 6 pgs.
Moderator (Lenovo), "Feature lead summary for [104-e-NR-52-71GHz-02] Email discussion/approval on PDCCH monitoring enhancements", R1-2101874, 3GPP TSG RAN WVGI#104-e, e-Meeting, (Jan. 29, 2021), 68 pgs.
Vivo, "Discussions on PDCCH monitoring enhancements for NR from 52.6-71GHz", R1-2102515, 3GPP TSG RAN WG1 #104b-e, e-Meeting, (Apr. 6, 2021), 7 pgs.
"Korean Application Serial No. 10-2023-7045199, Notice of Preliminary Rejection mailed Feb. 25, 2026", w English translation, 12 pgs.
LG, Electronics, "PDCCH monitoring enhancements to support NR above 52.6 GHz", 3GPP TSG RAN WG1 #104bis-E, R1-2103340, Apr. 7, 2021, 1 pg.
Moderator, Lenovo, "Feature lead summary for B52.6 Ghz PDCCH monitoring enhancements", 3GPP TSG RAN WG1 #104bis-E R1-2103689, Apr. 14, 2021, 70 pgs.
"International Application Serial No. PCT/US2022/021189, International Preliminary Report on Patentability mailed Feb. 15, 2024", 6 pgs.

* cited by examiner 402
404
406

(A)
X=8 SLOTS
X=8 SLOTS
Y=4 SLOTS
Y=4 SLOTS (B)
X=8 SLOTS
X=8 SLOTS
Y=4 SLOTS
Y=4 SLOTS (C)
X=8 SLOTS
X=8 SLOTS
Y=4 SLOTS
Y=4 SLOTS

MULTI-SLOT PDCCH MONITORING IN CONFIGURED SEARCH-SPACE SETS

PRIORITY CLAIMS

This application is a U.S. National Stage Filing under 35 U.S.C. 371 from International Application No. PCT/US2022/021189, filed Mar. 21, 2022 and published in English as WO 2023/014405 on Feb. 9, 2023, which claims priority to U.S. Provisional Patent Application Ser. No. 63/229,012, filed Aug. 3, 2021, U.S. Provisional Patent Application Ser. No. 63/256,418, filed Oct. 15, 2021, and U.S. Provisional Patent Application Ser. No. 63/275,388, filed Nov. 3, 2021, which are incorporated herein by reference in their entireties.

TECHNICAL FIELD

Embodiments pertain to wireless communications. Some embodiments relate to wireless networks including 3GPP (Third Generation Partnership Project) and fifth-generation (5G) networks including 5G new radio (NR) (or 5G-NR) networks. Some embodiments relate to sixth-generation (6G) networks. Some embodiments pertain physical downlink control channel (PDCCH) monitoring.

BACKGROUND

Mobile communications have evolved significantly from early voice systems to today's highly sophisticated integrated communication platform. With the increase in different types of devices communicating with various network devices, usage of 3GPP 5G NR systems has increased. The penetration of mobile devices (user equipment or UEs) in modern society has continued to drive demand for a wide variety of networked devices in many disparate environments. 5G NR wireless systems are forthcoming and are expected to enable even greater speed, connectivity, and usability, and are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

In NR Rel-15, when subcarrier spacing is increased from 15 kHz to 120 kHz, maximum number of blind decoding (BD) opportunities and control channel elements (CCEs) for PDCCH monitoring is reduced substantially. Thus, there are needs for PDCCH monitoring that consider the slot pattern of the PDCCH monitoring occasions of all configured search space sets.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments are directed to a user equipment (UE) configured for multi-slot physical downlink control channel (PDCCH) monitoring. In these embodiments, the UE may decode higher-layer signalling comprising configuration information received from a gNodeB (gNB). The configuration information may configure the UE with search space (SS) sets for multi-slot PDCCH monitoring. In these embodiments, at least some slots of the SS sets may be indicated to have a PDCCH monitoring occasion (MO). In these embodiments, a SS set may be configured in a number (Y) of consecutive non-overlapping slots (MO slots) within slot groups of a number (X) of consecutive non-overlapping slots. In these embodiments, the UE may perform multi-slot monitoring by monitoring the MO slots within the slot group of the configured SS sets. In these embodiments, the number of MO slots (Y) that comprise the PDCCH MO may be less than the number of slots (X) of the slot group that comprise the SS set (i.e., Y is less than to X), although the scope of the embodiments is not limited in this respect. In some embodiments, a gNB may limit the number of monitored PDCCH candidates in non-overlapping control channel elements (CCEs) in a group of consecutive slots.

Figure 2A:
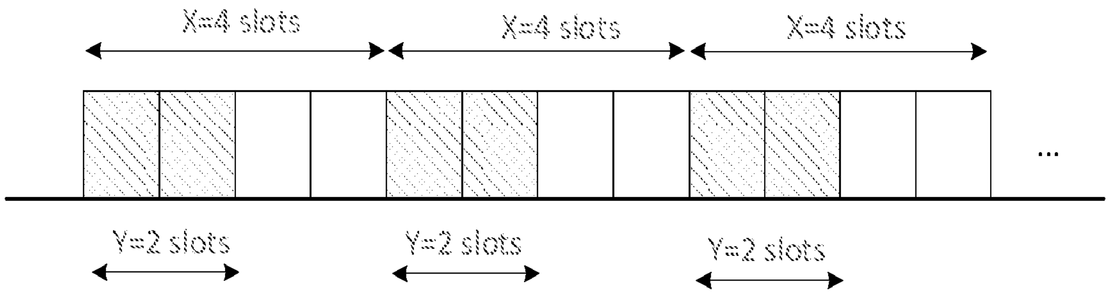
FIG. 2A illustrates one example of PDCCH monitoring capability defined in the first two slots in each group of Y slots, in accordance with some embodiments.

In some embodiments, the number (X) of consecutive slots of the slot group may be at least twice the number (Y) of consecutive MO slots within each SS set that comprise the PDCCH MO. In these embodiments, up to half the slots of a slot group may comprise a PDCCH MO, although the scope of the embodiments is not limited in this respect. For example, if a slot group comprises four slots, up to two slots comprise the PDCCH MO. An example of this is illustrated in FIG. 2A which is discussed in more detail below. In some embodiments, the number (X) of consecutive slots of the slot group is exactly twice the number (Y) of consecutive MO slots within each SS set that comprise the PDCCH MO (i.e., X=2Y). For example, if X=4 and Y=2, then out of every 4 consecutive slots, the UE is configured to monitor 2 slots.

In some embodiments, the number (X) of consecutive slots of the slot group and the number (Y) of consecutive MO slots within each SS set that comprise the PDCCH MO may be based on a subcarrier spacing (SCS). In these embodiments, for an SCS of 480 kHz, the number (X) of consecutive slots of the slot group may be four and the number (Y) of consecutive MO slots within each SS set that comprise the PDCCH MO may be two. In these embodiments, for an SCS of 960 kHz, the number (X) of consecutive slots of the slot group may be eight and the number (Y) of consecutive MO slots within each SS set that comprise the PDCCH MO may be four, although the scope of the embodiments is not limited in this respect.

In some embodiments, for an SCS of 480 kHz, the number (X) of consecutive slots of the slot group may be four and the number (Y) of consecutive MO slots within each SS set that comprise the PDCCH MO may be one for an SCS of 960 kHz, the number (X) of consecutive slots of the slot group may be eight and the number (Y) of consecutive MO slots within each SS set that comprise the PDCCH MO may be one, although the scope of the embodiments is not limited in this respect.

In some embodiments, the UE may perform the multi-slot monitoring for higher-frequency operations comprising operations with carrier frequencies above 52.6 GHz with a subcarrier spacing (SCS) of 480 kHz and 960 kHz. In these embodiments, the UE may refrain from performing the multi-slot monitoring for the higher-frequency operations with a SCS of 120 kHz. In these embodiments, UE may refrain from performing the multi-slot monitoring for lower-frequency operations comprising operations with carrier frequencies below 52.6 GHz, although the scope of the embodiments is not limited in this respect.

Figure 4A:
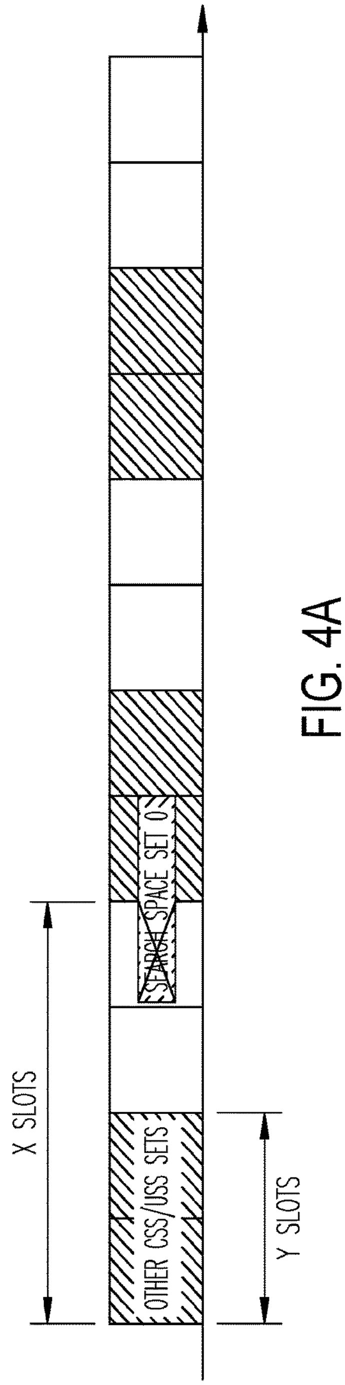
FIG. 4A illustrates an example of dropping a slot configured with Type 0/0A/1/2 CSS sets with search space set 0 when the first option of multi-slot PDCCH monitoring capability is used, in accordance with some embodiments.

In some embodiments, the location of the Y consecutive MO slots within the slot group may be determined from the configured SS sets. In these embodiments, the location of the Y consecutive MO slots within the slot group may be maintained (i.e., may be the same) across different slot groups. In these embodiments, a beginning of a first slot of the slot group may be aligned with a subframe boundary. In these embodiments, the value of (Y) as well as the position of the consecutive MO slots within the slot group may be determined by the UE by analyzing the configured SS sets, although the scope of the embodiments is not limited in this respect. An example of this is illustrated in FIG. 4C which is discussed in more detail below.

In some embodiments, the SS sets may comprise at least one of category 1 (CAT-1) SS sets and category two (CAT-2) SS sets. In these embodiments, the UE may monitor the CAT-1 SS sets in Y2=X consecutive slots of an X-slot group. In these embodiments, the UE may be configured to monitor the CAT-2 SS sets in Y consecutive slots of an X-slot group. In these embodiments, Y2=X and the CAT-1 search space sets are monitored in Y2 consecutive slots in a X-slot group, while the CAT-2 search space sets are monitored in Y consecutive slots in the X-slot group, although the scope of the embodiments is not limited in this respect. It should be noted that there is no requirement that CAT-1 search space sets be configured in all slots. It should also be noted that there is no requirement that CAT-2 search space sets be configured in all slots.

In some embodiments, the CAT-1 SS sets may comprise one or more of Type 0, Type 0A, Type 2 and Type 1 common search space (CSS) sets without a dedicated radio resource control (RRC) configuration. In these embodiments, the CAT-2 SS sets may comprise one or more a Type 1 CSS set with the dedicated RRC configuration, a Type 3 CSS set and UE-specific search space (USS) set, although the scope of the embodiments is not limited in this respect.

In some embodiments, the configuration information may indicate a downlink control information (DCI) format. In these embodiments, the UE may be configured to perform multi-slot monitoring by monitoring the MO slots within the slot group of the configured SS sets for blind detection of PDCCH candidates for the indicated DCI format. The UE may also decode the DCI format that schedules one or multiple physical downlink shared channels (PDSCHs), although the scope of the embodiments is not limited in this respect.

In some embodiments, the higher-layer signalling may configure the UE with up to forty SS sets for a serving cell. In these embodiments, the SS sets configured to the UE configures the timing for the multi-slot PDCCH monitoring and includes a set of control channel elements (CCE)

carrying PDCCH candidates. In these embodiments, the UE may be configured to decode PDCCH transmissions carried in a control resource set (CORESET) within the set of CCEs. In these embodiments, the PDCCH candidates have an aggregation level (L) corresponding to the number of CCEs of the set, the aggregation level being one of 1, 2, 4, 8, 16, although the scope of the embodiments is not limited in this respect.

In some embodiments, the higher-layer signalling may indicate the number (X) of consecutive slots of the slot group. In some embodiments, the higher-layer signalling may comprise a parameter that indicates a periodicity corresponding to the number (X) of consecutive slots of the slot group, although the scope of the embodiments is not limited in this respect.

Some embodiments are directed to a non-transitory computer-readable storage medium that stores instructions for execution by processing circuitry for a user equipment (UE). In these embodiments, the instructions may configure the processing circuitry to decode higher-layer signalling comprising configuration information received from a gNodeB (gNB). The configuration information may configure the UE with search space (SS) sets for multi-slot physical downlink control channel (PDCCH) monitoring. In these embodiments, at least some slots of the SS sets may be indicated to have a PDCCH monitoring occasion (MO). In these embodiments, a SS set may be configured in a number (Y) of consecutive non-overlapping slots (MO slots) within slot groups of a number (X) of consecutive non-overlapping slots. In these embodiments, the UE may be configured to perform multi-slot monitoring by monitoring the MO slots within the slot group of the configured SS sets, although the scope of the embodiments is not limited in this respect.

Some embodiments are directed to a gNodeB (gNB). In these embodiments, the gNB may encode higher-layer signalling comprising configuration information for transmission to configure a user equipment (UE) with search space (SS) sets for multi-slot physical downlink control channel (PDCCH) monitoring. In these embodiments, at least some slots of the SS sets may be indicated to have a PDCCH monitoring occasion (MO). In these embodiments, a SS set may be configured in a number (Y) of consecutive non-overlapping slots (MO slots) within slot groups of a number (X) of consecutive non-overlapping slots. In these embodiments, the higher-layer signalling may configure the UE to perform multi-slot monitoring by monitoring the MO slots within the slot group of the configured SS sets, although the scope of the embodiments is not limited in this respect.

Figure 1A:
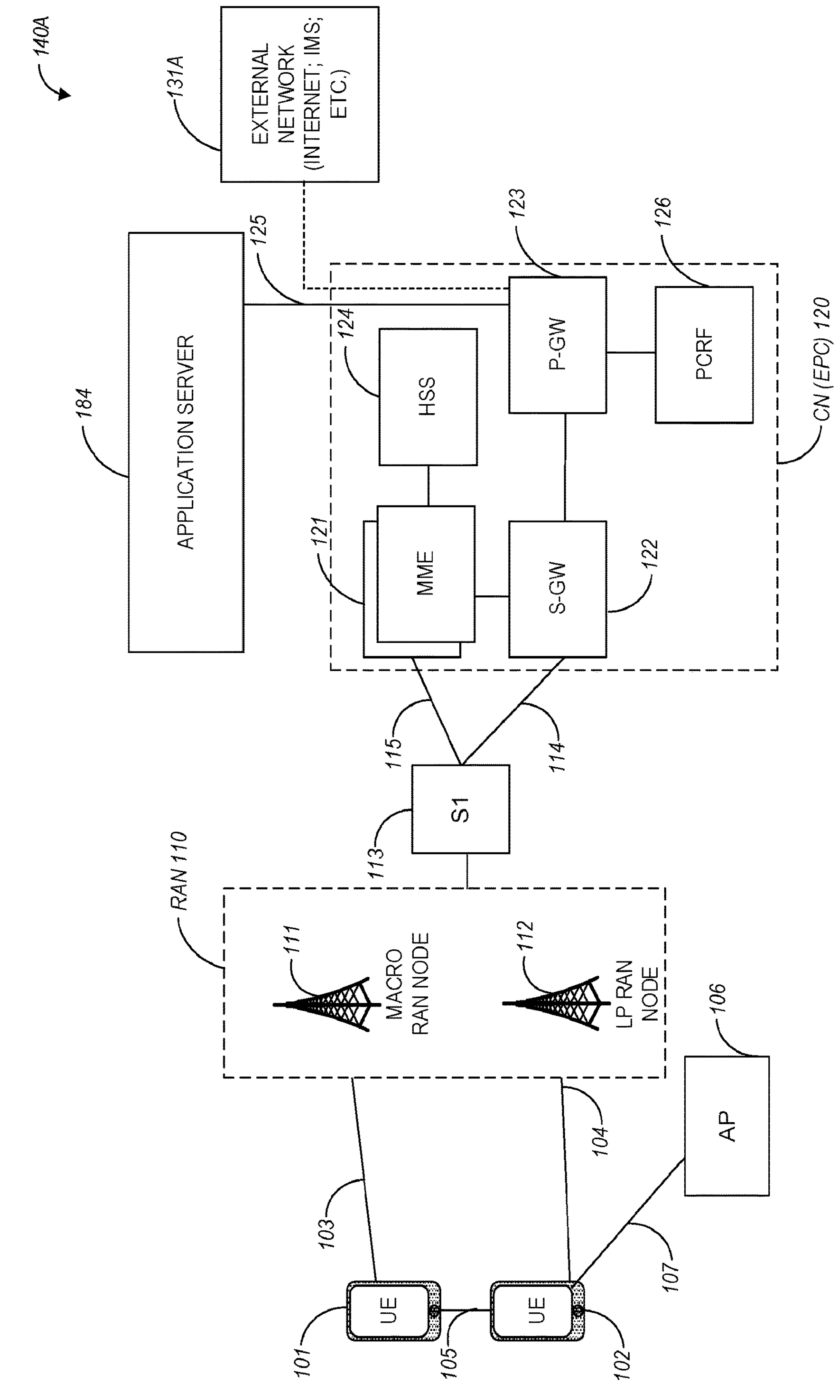
FIG. 1A illustrates an architecture of a network, in accordance with some embodiments.

FIG. 1A illustrates an architecture of a network in accordance with some embodiments. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some embodiments, carrier aggregation may be used where one or more component carriers operate on unlicensed frequencies.

Embodiments described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHZ, 3.6-3.8 GHz, and further frequencies and Spectrum Access System (SAS) in 3.55-3.7 GHZ and further frequencies).

Embodiments described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some embodiments, any of the UEs 101 and 102 can comprise an Internet-of-Things (IoT) UE or a Cellular IoT (CIoT) UE, which can comprise a network access layer designed for low-power IoT applications utilizing short-lived UE connections. In some embodiments, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some embodiments, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some embodiments, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro-RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In some embodiments, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility embodiments in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VOIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some embodiments, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some embodiments, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some embodiments, the gNBs and the NG-eNBs can be connected to the AMF by NG-C interfaces, and to the UPF by NG-U interfaces. The gNBs and the NG-eNBs can be coupled to each other via Xn interfaces.

In some embodiments, the NG system architecture can use reference points between various nodes as provided by 3GPP Technical Specification (TS) 23.501 (e.g., V15.4.0, 2018-12). In some embodiments, each of the gNBs and the NG-eNBs can be implemented as a base station, a mobile edge server, a small cell, a home eNB, and so forth. In some embodiments, a gNB can be a master node (MN) and NG-eNB can be a secondary node (SN) in a 5G architecture.

Figure 1B:
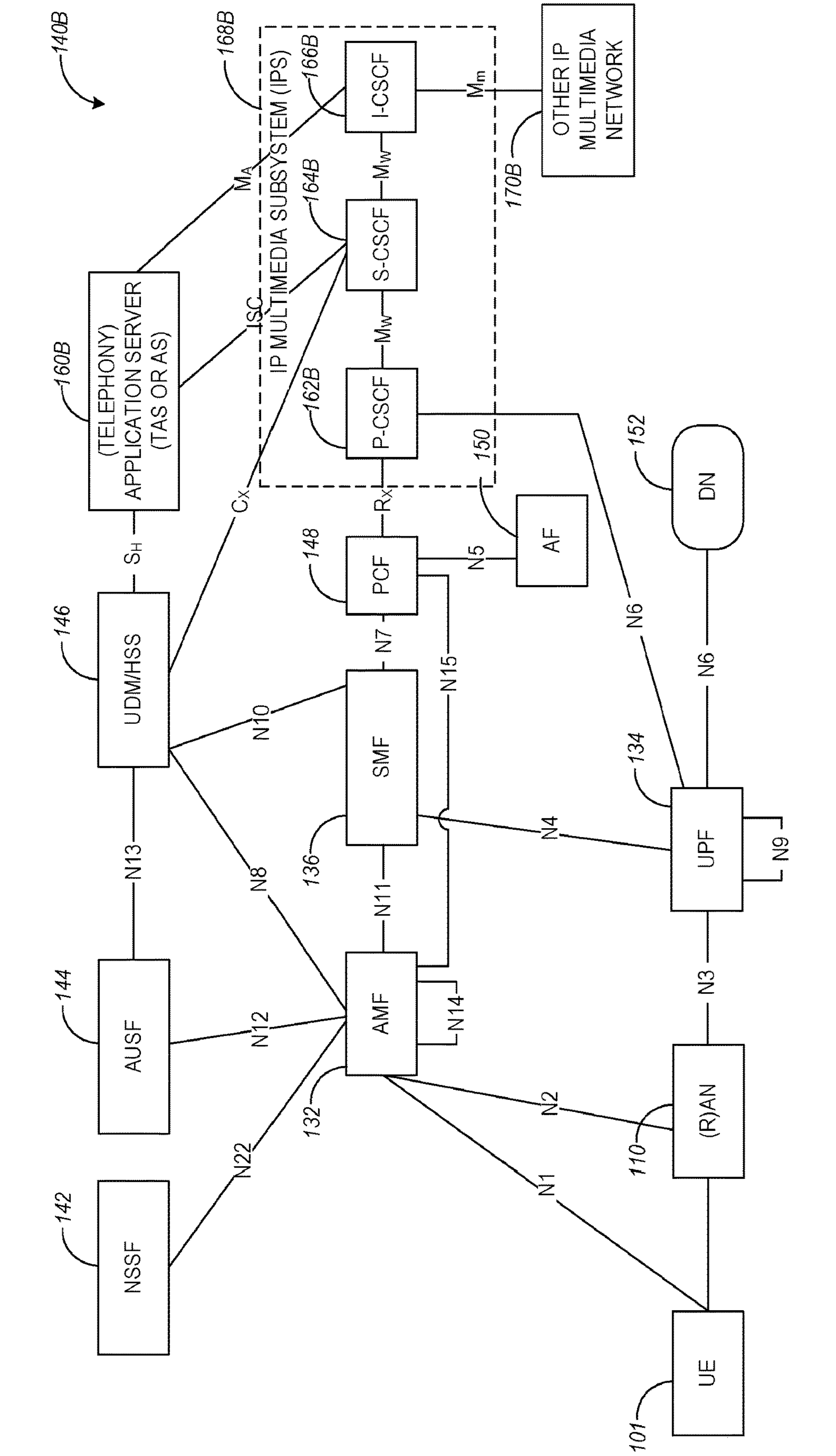
FIG. 1B and FIG. 1C illustrate a non-roaming 5G system architecture in accordance with some embodiments.

FIG. 1B illustrates a non-roaming 5G system architecture in accordance with some embodiments. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some embodiments, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain embodiments of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some embodiments, the I-CSCF 166B can be connected to another IP multimedia network 170E, e.g. an IMS operated by a different network operator.

In some embodiments, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
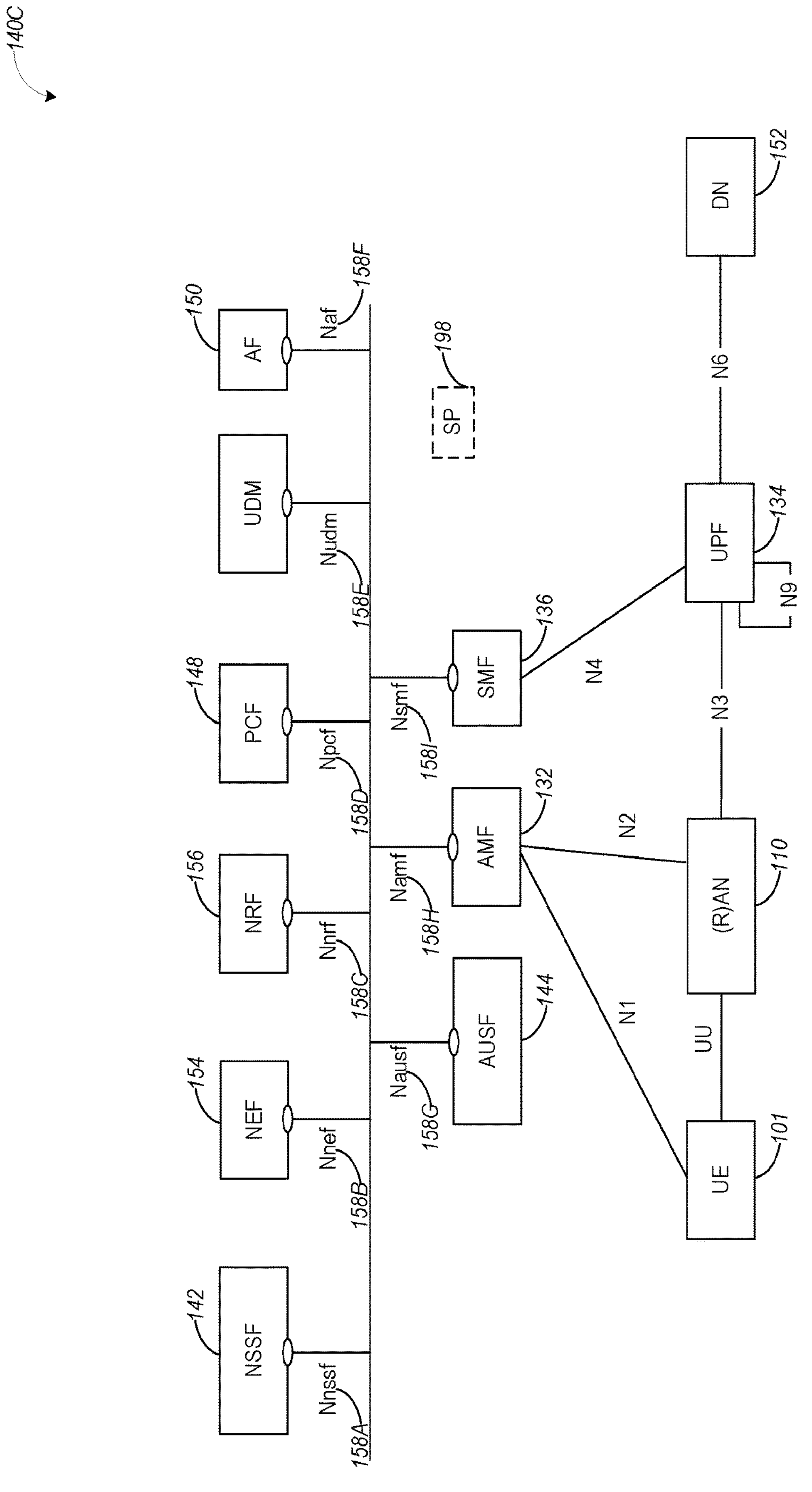

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some embodiments, 5G system architectures can be service-based and interaction between network functions can be represented by corresponding point-to-point reference points Ni or as service-based interfaces.

In some embodiments, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In some embodiments, any of the UEs or base stations described in connection with FIGS. 1A-1C can be configured to perform the functionalities described herein.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that targets to meet vastly different and sometimes conflicting performance dimensions and services. Such diverse multi-dimensional requirements are driven by different services and applications. In general, NR will evolve based on 3GPP LTE-Advanced with additional potential new Radio Access Technologies (RATs) to enrich people's lives with better, simple, and seamless wireless connectivity solutions. NR will enable everything connected by wireless and deliver fast, rich content and services.

Rel-15 NR systems are designed to operate on the licensed spectrum. The NR-unlicensed (NR-U), a shorthand notation of the NR-based access to unlicensed spectrum, is a technology that enables the operation of NR systems on the unlicensed spectrum.

Figure 1D:
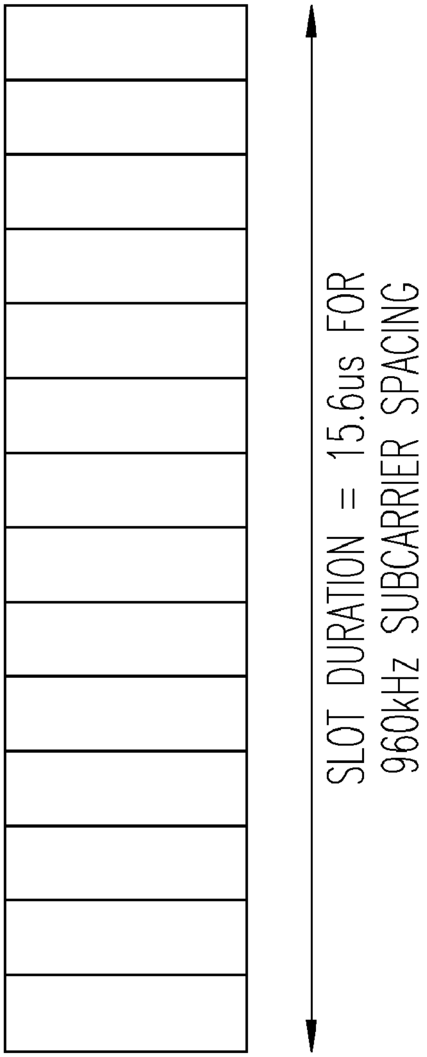
FIG. 1D illustrates a short slot duration of larger subcarrier spacing, in accordance with some embodiments.

As defined in NR, one slot has 14 symbols. For a system operating above 52.6 GHz carrier frequency, if larger subcarrier spacing (SCS), e.g., 960 kHz is employed, the slot duration can be very short. For instance, for SCS 960 kHz, one slot duration is approximately 15.6 us as shown in FIG. 1D. FIG. 1D illustrates a short slot duration of larger subcarrier spacing.

In NR, a control resource set (CORESET) is a set of time/frequency resources carrying PDCCH transmissions. The CORESET is divided into multiple control channel elements (CCE). A physical downlink control channel (PDCCH) candidate with aggregation level (AL) L consists of L CCEs. L could be 1, 2, 4, 8, 16. A search space set can be configured to a UE, which configures the timing for PDCCH monitoring and a set of CCEs carrying PDCCH candidates for the UE. A UE can be configured with up to 40 search space sets for a serving cell. The maximum number of search space sets per bandwidth part (BWP) is 10.

For a search space set other than search space set 0, a first slot for PDCCH monitoring is configured by a periodicity and an offset (monitoringSlotPeriodicityAndOffset). The number of consecutive slots starting from the first slot is configured by duration. Further, within the set of slots configured by the first slot and the duration, the first symbol (s) for PDCCH monitoring in each slot is configured by monitoringSymbolsWithinSlot. On the other hand, the slot timing of search space set 0 is dependent on the associated SS/PBCH.

In NR Rel-15, when subcarrier spacing is increased from 15 kHz to 120 kHz, maximum number of BDs and CCEs for PDCCH monitoring is reduced substantially. This is primarily due to UE processing capability with short symbol and slot duration. For system operating between 52.6 GHz and 71 GHz carrier frequency, when a large subcarrier spacing is introduced, it is envisioned that maximum number of BDs and CCEs for PDCCH monitoring would be further scaled down. For instance, the number of BDs for PDCCH monitoring may be reduced to ~10 or even smaller values when 960 kHz subcarrier spacing is employed.

Embodiments disclosed herein provide a detailed design for handling PDCCH monitoring capability considering the slot pattern of the PDCCH monitoring occasions of all configured search space sets. Embodiments disclosed herein also provide a detailed design for multi-slot PDCCH monitoring capability to handle different kinds of search space set configurations in system operating above 52.6 GHz carrier frequency. These embodiments are described in more detail below.

For a system operating in high frequency, when a large subcarrier spacing (SCS) is introduced, it is envisioned that maximum numbers of monitored PDCCH candidates and non-overlapped CCEs for PDCCH monitoring would be further scaled down. Especially for non-overlapped CCEs, it causes limitation on the aggregation level (AL) of a PDCCH candidate. For example, if the maximum number of non-overlapped CCEs is less than 16, a PDCCH AL 16 cannot be supported in high frequency. On the other hand, if the total number of monitored PDCCH candidates and non-overlapped CCEs in a slot is not reduced, the total number of monitored PDCCH candidates and non-overlapped CCEs in the consecutive slots become quite larger, which enforces an extreme high UE capability for PDCCH monitoring. To balance PDCCH monitoring in a slot and in multiple consecutive slots, the PDCCH monitoring capability can be defined so that the maximum numbers for PDCCH monitoring applies to a group of consecutive slots, i.e. multi-slot PDCCH monitoring capability. The total numbers of monitored PDCCH candidates and non-overlapped CCEs in the group of slots are respectively limited to the corresponding maximum numbers.

In a first option, in a multi-slot PDCCH monitoring capability, the PDCCH MOs can only be configured in Y slots, e.g., the first Y consecutive slots within every group of X consecutive slots, Y=X. The position of the Y slots can be same in all the X-slot groups. The total number of monitored PDCCH candidates and non-overlapped CCEs in the Y slots are limited by the corresponding maximum numbers of the PDCCH monitoring capability. The number and positions of slots that are configured with PDCCH MOs in the Y slots may be same or different in the different slot groups. FIG. 2A illustrate one example of PDCCH monitoring capability defined in the first 2 slots in each group of Y slots. Alternatively, X and/or Y could be defined in number of symbols, (e.g., Y can be up to 3 symbols, or Y can be larger than 3 symbols). This capability can be expressed as a combination of (X, Y) with X being the fixed size of slot group. FIG. 2A illustrates a fixed group pattern of X slots.

Figure 2B:
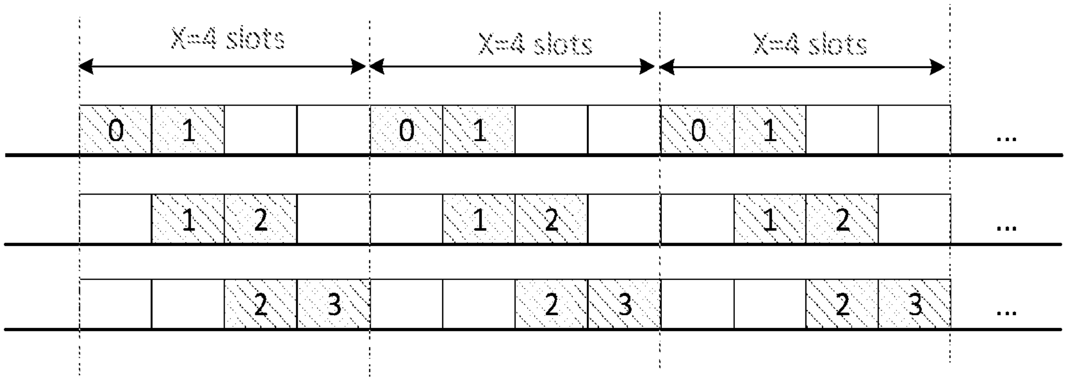
FIG. 2B illustrates the three possible positions of the Y=2 slots in the slot group with X=4, in accordance with some embodiments.

For a combination (X, Y) of the first option, there can be X−Y+1 possible positions of the Y slots in the X-slot group. The Y slots are consecutive and located with a X-slot group. The X−Y+1 possible positions respectively have starting slot offset 0, 1, . . . , X−Y in the X-slot group. All the X−Y+1 positions of the Y slots can be applicable for a combination (X, Y). Alternatively, only a subset of the X−Y+1 positions of the Y slots can be applicable for a combination (X, Y). FIG. 2B illustrates the 3 possible positions of the Y=2 slots in the slot group with X=4. FIG. 2B shows X−Y+1 fixed group pattern of Y slots.

Figure 2C:
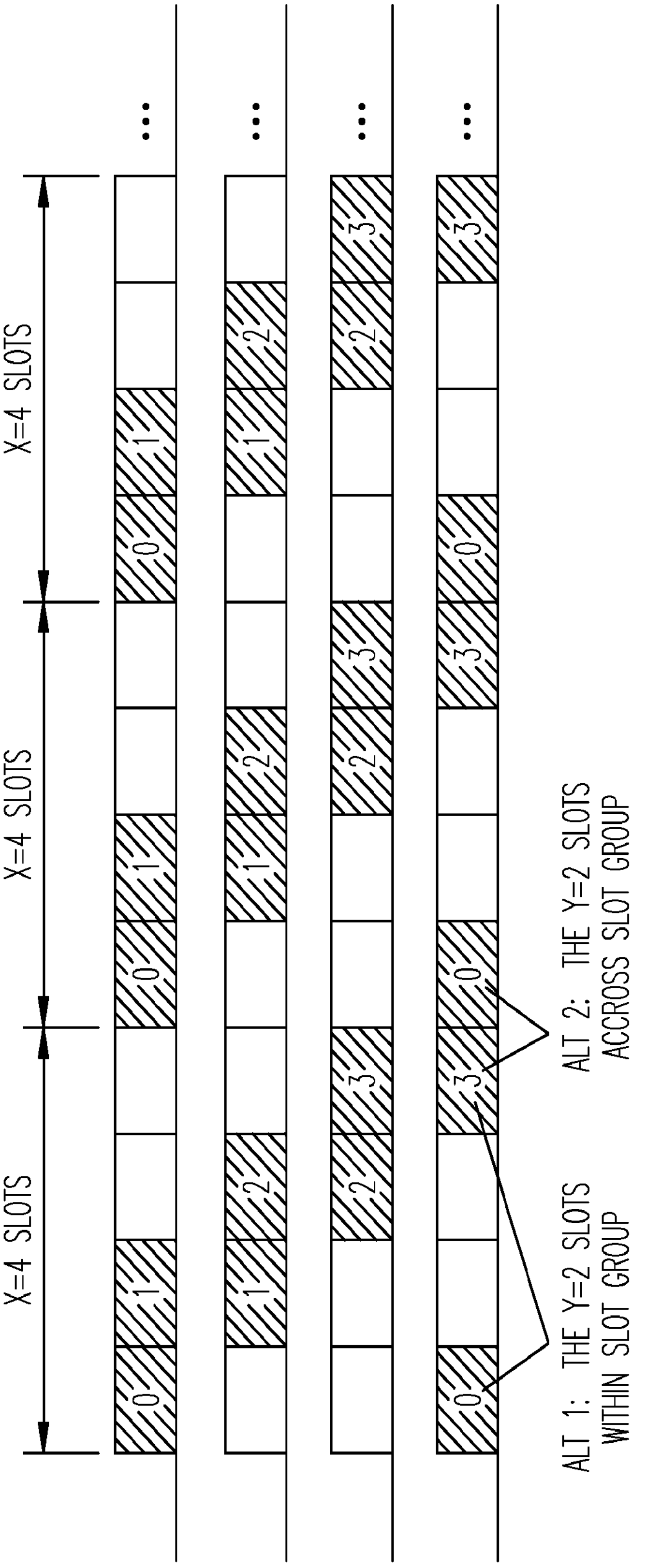
FIG. 2C illustrates the four possible positions of the Y=2 slots in the slot group with X=4, in accordance with some embodiments.

For a combination (X, Y) of the first option, there can be X possible positions of the Y slots in the X-slot group. The X possible positions respectively have starting slot offset 0, 1, . . . . X−1 in the X-slot group. For the position starting from offset k in a X-slot group, the Y slots may include slot offsets mod(k+y, X) in the X-slot group, y=0, 1 . . . Y−1. In this way, the Y slots may not map to consecutive slots in the X-slot group. Alternatively, for the position starting from offset k in a X-slot group, the Y slots may include slot offsets k+y, x=0, 1, . . . Y−1 For a slot offset k+y≥X, it is associated with the slot offset mod(k+y, X) of the next X-slot group. In the latter case, the maximum numbers of the PDCCH monitoring capability applies to the Y consecutive slots across X-slot group boundary. All the X positions of the Y slots can be applicable for a combination (X, Y). Alternatively, only a subset of the X positions of the Y slots can be applicable for a combination (X, Y). FIG. 2C illustrates the 4 possible positions of the Y=2 slots in the slot group with X=4. In Alt 1 of the lower portion in FIG. 2C, the Y=2 slots are mapped to non-consecutive slot offset 3 and 0 in the X-slot group. In Alt 2 of the lower portion in FIG. 2C, the Y=2 slots are mapped to consecutive slot offset 3 in the X-slot group and slot offset 0 in the next X-slot group. FIG. 2C shows X fixed group pattern of Y slots.

Figure 2D:
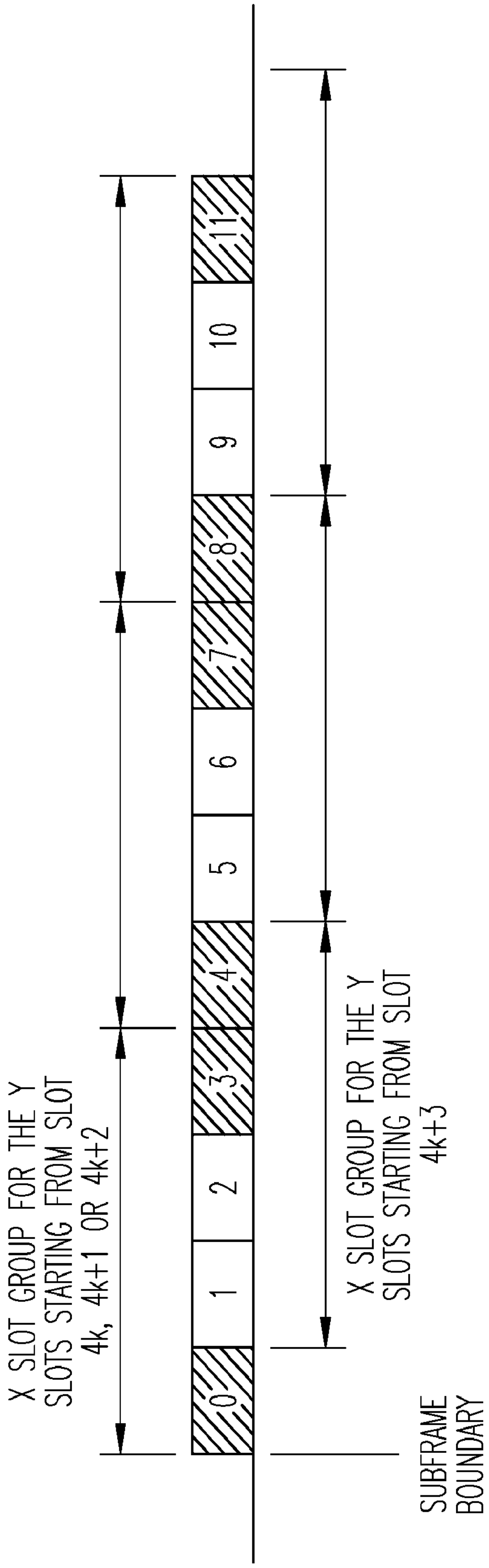
FIG. 2D illustrates an example of adaptation of the definition of X-slot groups, in accordance with some embodiments.

If the Y consecutive slots are across the boundary of two X-slot groups according to a definition of X-slot groups, e.g., the lower portion as shown in FIG. 2C, the definition of X-slot groups can be adapted so that the Y consecutive slots are not across the boundary of two X-slot groups with new definition of X-slot groups. FIG. 2D illustrates an example of adaptation of the definition of X-slot groups. When the Y=2 consecutive slots start from slot 4k, 4k+1, 4k+2, the X-slot group may be defined referring to the subframe boundary. On the other hand, when the Y=2 consecutive slots start from slot 4k+3, the X-slot group can be shifted right by one slot. By this way, the Y=2 consecutive slots start from slot 4k+3 are in single X-slot group. FIG. 2D shows flexible position of X-slot group.

Figure 3:
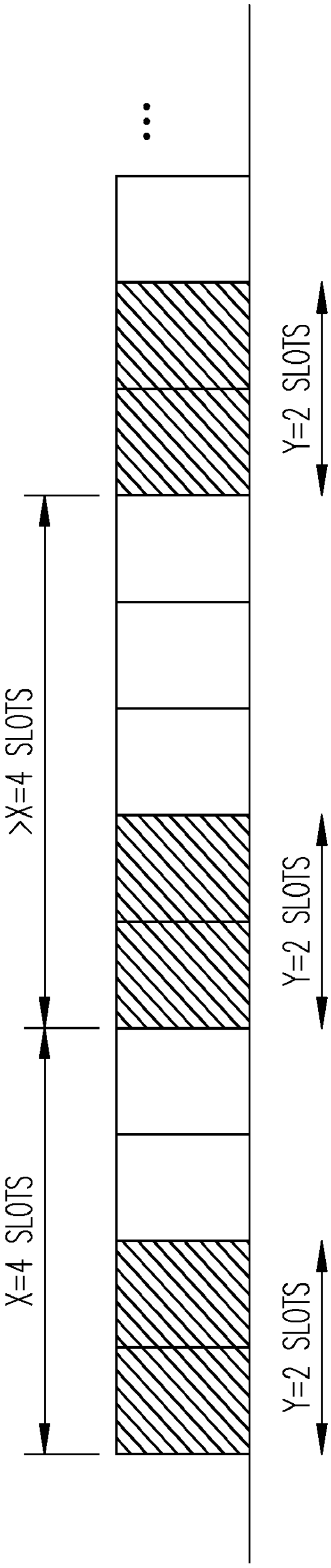
FIG. 3 illustrate one example that a span has up to two slots and the gap between spans is four slots, in accordance with some embodiments.

In a second option, a multi-slot PDCCH monitoring capability is defined by combination (X, Y), where the PDCCH MOs are configured in each slot in a span of up to Y consecutive slots and the distance between the start slots of two adjacent spans is at least X slots, Y≤X. Alternatively, the PDCCH MOS are configured in a span of Y consecutive symbols and/or X may also be defined in number of symbols. For example, Y can be up to 3 symbols, or Y can be larger than 3 symbols. This capability can be expressed as a combination of (X, Y) with X being the minimum gap between two spans. A span is defined starting from a first slot with configured PDCCH MOs. FIG. 3 illustrate one example that a span has up to 2 slots and the gap between spans is 4 slots. FIG. 3 shows spans of Y symbols with gap of at least X slots.

The search space set 0 in NR can be determined by searchSpaceZero in pdcch-ConfigSIB1 in MIB, or by searchSpaceZero in PDCCH-ConfigCommon. For Type 0/0A/1/2 CSS sets that are associated with search space set 0, the UE monitors PDCCH candidates only at monitoring occasions associated with a SS/PBCH block, where the SS/PBCH block is determined by the most recent of: a MAC CE activation command indicating a TCI state of the active BWP that includes a CORESET with index 0, as described in TS 38.214, where the TCI-state includes a CSI-RS which is quasi-co-located with the SS/PBCH block, or a random access procedure that is not initiated by a PDCCH order that triggers a contention-free random access procedure.

For SS/PBCH block and CORESET multiplexing pattern 1 in NR, UE monitors Type 0/0A/1/2 CSS sets with search space set 0 in two consecutive slots. The time position of the two slots depend on the position of the associated with a SS/PBCH block. When the SS/PBCH is changed, the combined slot pattern that includes all slots configured with Type 0/0A/1/2 CSS sets or other CSS/USS sets is changed accordingly.

In general, the search space sets can be divided into two categories. The time position of search space set category 1 (CAT-1) depends on the position of the associated SS/PBCH block, e.g., Type 0/0A/1/2 CSS sets with search space set 0. On the other hand, search space set category 2 (CAT-2) is independent from SS/PBCH block, e.g., a CSS/USS set that is configured by high layer parameters monitoringSlotPeriodicityAndOffset and duration in NR. In some other embodiments, search space set CAT-1 may include Type0/0A/2 CSS sets and Type1 CSS set without dedicated RRC configuration. Further, search space set CAT-2 may include Type1 CSS set with dedicated RRC configuration, Type3 CSS sets and USS sets. In general, search space set CAT-1 may include Type0/0A/2 CSS sets with search space set 0 and some other CSS sets. Further, search space set CAT-2 may include USS sets and other CSS sets.

As a result, the combined pattern of slots configured with search space sets may not always satisfy the slot pattern of multi-slot PDCCH monitoring capability, e.g., the above first option and second option shown in FIG. 2A and FIG. 3.

Common Value Y for all Configured SS Sets

Assuming CAT-1 search space sets are in N consecutive slots, the N slots are determined by the slot(s) of search space set 0. If CAT-1 search space sets include search space set 0 and other search space sets, the other search space sets of CAT-1 are only monitored in the N slots by UE. Alternatively, the other search space sets of CAT-1 can be monitored in the Y slots of CAT-2 search space sets by UE. The position of the Y slots in a X-slot group can be determined by the position of the N slots in the X-slot group. The N slots must be within a X-slot group. Alternatively, the N slots may be across the boundary of two X-slot groups. In such case, UE may only monitor the PDCCH MOs of CAT-1 search space sets in the former or the later X-slot group. Alternatively, UE may monitor the PDCCH MOs of CAT-1 search space sets in the N slots across the two X-slot groups.

In one embodiment, if the combined pattern of slots configured with search space sets does not satisfy the slot pattern of the multi-slot PDCCH monitoring capability, UE may drop the PDCCH monitoring occasions in one or more slots so that the remaining slots for PDCCH monitoring satisfy the slot pattern of the multi-slot PDCCH monitoring capability. UE may expect the configured CAT-2 search space sets must satisfy the slot pattern of the multi-slot PDCCH monitoring capability. Alternatively, CAT-2 search space sets can be configured that doesn't satisfy the slot pattern of the multi-slot PDCCH monitoring capability. That is, it relies on dropping one or multiple slots configured with CAT-2 search space sets to satisfy the slot pattern of the multi-slot PDCCH monitoring capability. In the latter scheme, gNB can configure extra PDCCH monitoring occasions for a CAT-2 search space set than that UE can monitored based on the multi-slot PDCCH monitoring capability. For the first option of the multi-slot PDCCH monitoring capability, a PDCCH monitoring occasion of the CAT-2 search space set is valid for PDCCH monitoring only when the PDCCH monitoring occasion is mapped with the Y slots of the X-slot group.

In one option, the PDCCH monitoring occasions in a slot that is only configured with CAT-1 search space set can be dropped, until the remaining slots for PDCCH monitoring satisfy the slot pattern of the multi-slot PDCCH monitoring capability. FIG. 4A shows an example of dropping a slot configured with Type 0/0A/1/2 CSS sets with search space set 0 when the first option of multi-slot PDCCH monitoring capability is used. It is assumed that X equals to 4 and Y equals to 2. The first slot carrying search space set 0 is dropped, so that the pattern of remaining slots for PDCCH monitoring are valid for the first option of multi-slot PDCCH monitoring capability. FIG. 4A shows dropping a slot of search space set 0.

In one option, for the first option of the multi-slot PDCCH monitoring capability (X, Y), the position of the Y slot(s) in a X-slot group can be determined to at least include the slot(s) with CAT-1 search space sets. If Y is larger than the number of slots with CAT-1 search space sets in a X-slot group, there can be multiple candidate positions of the Y slots in the X-slot group if only the search space set CAT-1 is considered. Further, an active position of the Y slots in a X-slot group can be determined by the slots with CAT-2 search space sets. The active position of the Y slots should be same in all the X-slot groups. All CSS/USS sets should be configured within the Y slots of the X-slot groups. Dropping one or multiple slots configured with CAT-2 search space sets can be used to satisfy the rule.

Figure 4B:
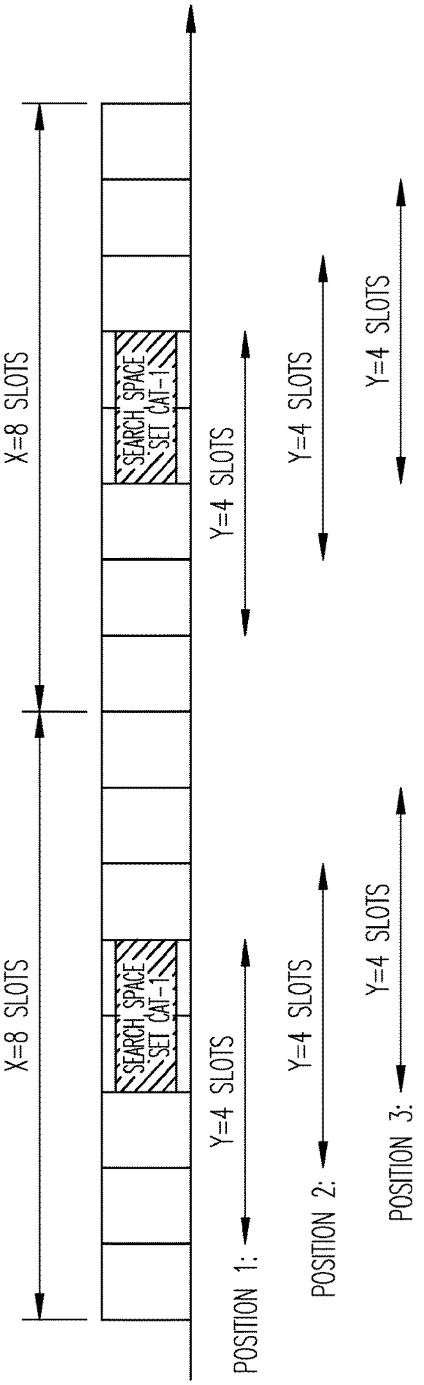
FIG. 4B illustrates an example for the determination of the position of the Y slots in the X-slot group based on CAT-1 and CAT-2 search space sets, in accordance with some embodiments.
Figure 4C:
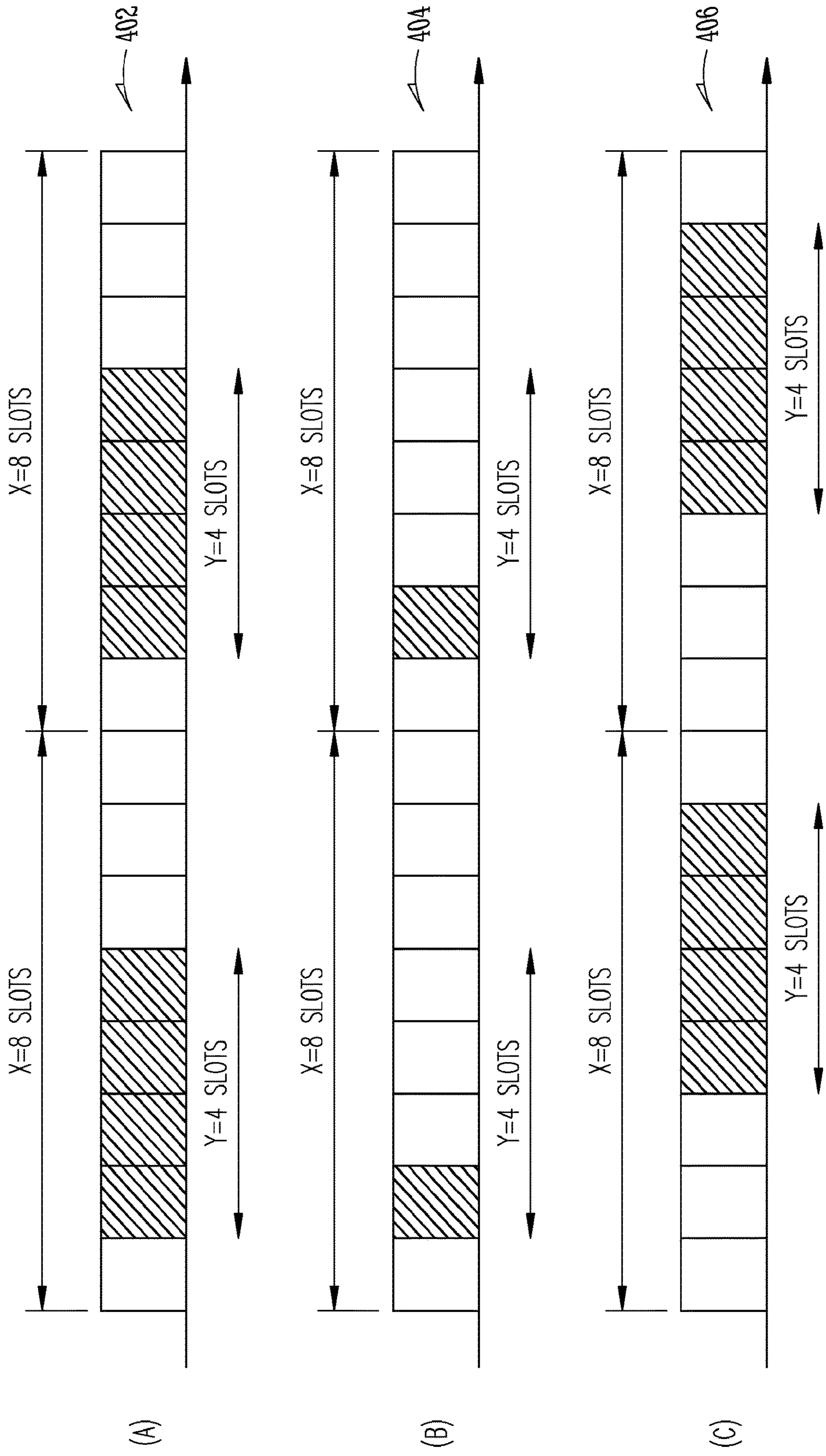
FIG. 4C illustrates an example to generate the valid PDCCH monitoring occasion for a CAT-2 search space set based on the slot pattern of the multi-slot PDCCH monitoring capability (X, Y), if X equals to eight and Y equals to four, in accordance with some embodiments.

FIG. 4B shows an example for the determination of the position of the Y slots in the X-slot group based on CAT-1 and CAT-2 search space sets, if X equals to 8 and Y equals to 4. It assumes that CAT-1 search space set, e.g., search space set 0 is mapped to two consecutive slots. Since the value Y is larger than number of consecutive slots of CAT-1 search space set, the slots of CAT-1 search space set only determines a rough position of the Y slots in the X-slot group. There are still three candidates of the Y slots in the X-slot group to accommodate CAT-2 search space sets, i.e., position 1, 2 or 3. FIG. 4B shows positions of the Y slots to include search space set CAT-1.

If multiple positions of the Y slots in the X-slot group can be determined by only considering the search space set CAT-1, the active position of the Y slots for multi-slot PDCCH monitoring could be defined by a rule, e.g., the position with lowest or highest starting slot of the Y slots in the X-slot group. Alternatively, if multiple positions of the Y slots in the X-slot group can be determined by only considering the search space set CAT-1, an active position of the Y slots could be determined by 1) the starting slot or ending slot of the position contains CAT-2 search space set; 2) the position has the lowest or highest starting slot of the Y slots in the X-slot group. Alternatively, if multiple positions of the Y slots in the X-slot group can be determined by only considering the search space set CAT-1, an active position of the Y slots could be determined by 1) the starting slot or ending slot of the position contains any search space set; 2) the position has the lowest or highest starting slot of the Y slots in the X-slot group. If a PDCCH monitoring occasion of a CAT-2 search space set is not within the Y slots in the X-slot group of the active position, the PDCCH monitoring occasion is dropped in all slots in the X-slot group. Alternatively, only the PDCCH monitoring occasion of the CAT-2 search space that is not within the Y slots of the active position is dropped.

Alternatively, if multiple positions of the Y slots in the X-slot group can be determined by only considering the search space set CAT-1, the active position of the Y slots for multi-slot PDCCH monitoring could be determined so that the PDCCH monitoring occasions of all CAT-2 search space sets are within the Y slots of the active position. If such active position does not exist, one or more CAT-2 search space sets, e.g., the search space sets with high search space set index(es), can be dropped until an active position of the Y slots can be determined, where the PDCCH monitoring occasions of all remaining CAT-2 search space sets are within the Y slots of the active position. If multiple positions of the Y slots can contain all CAT-2 search space sets or all remaining CAT-2 search space sets, one position can be determined by other rules.

Figure 5:
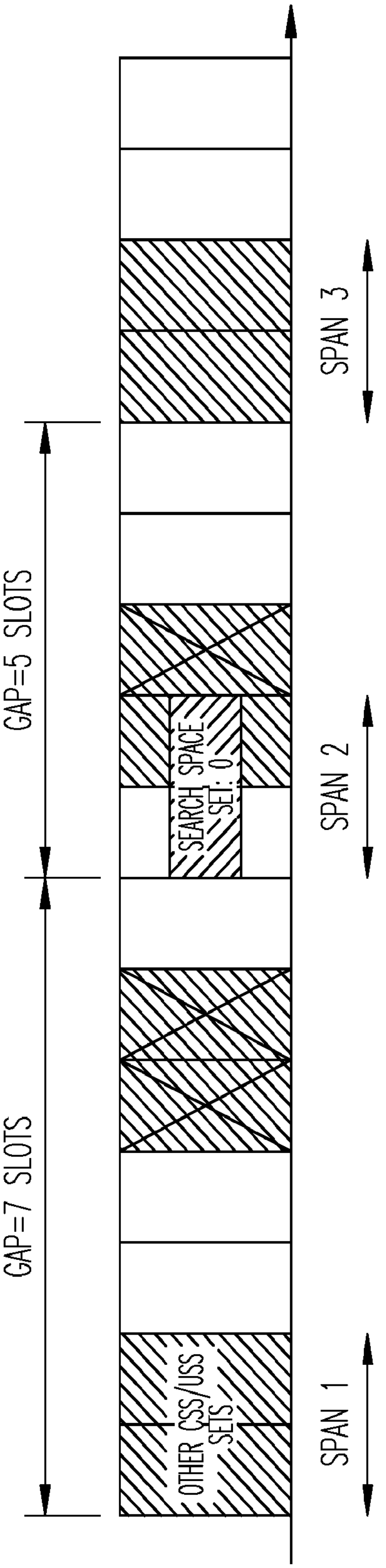
FIG. 5 illustrates an example of dropping a slot not configured with search space set 0 when the second option of multi-slot PDCCH monitoring capability combination (X, Y) is used, in accordance with some embodiments.

In one option, one or multiple slot(s) that is only configured with CAT-2 search space sets is dropped firstly. If the pattern of the remaining slots still doesn't satisfy the slot pattern of the multi-slot PDCCH monitoring capability, a slot that is only configured with CAT-1 search space set can be dropped, until the remaining slots for PDCCH monitoring satisfy the slot pattern of the multi-slot PDCCH monitoring capability. FIG. 5 shows an example of dropping a slot not configured with search space set 0 when the second option of multi-slot PDCCH monitoring capability combination (X, Y) is used. It is assumed that the minimum gap X between two spans is 4 and the maximum length of a span Y is 2. Due to the presence of the two slots carrying search space set 0, two earlier slots and one later slot that are configured with search space sets other than search space set 0 have to be dropped, to maintain the slot gap that is not less than 4 slots. FIG. 5 shows dropping a slot not configured with search space set 0.

In one option, one slot that is only configured with CAT-1 search space is dropped firstly. Preferably, if the pattern of the remaining slots after dropping a slot that is configured with CAT-1 search space set can satisfy the slot pattern of the multi-slot PDCCH monitoring capability, the slot is dropped. Alternatively, a slot that is only configured with CAT-1 search space set with lower slot index or higher slot index is dropped. If the pattern of the remaining slots cannot satisfy the slot pattern of the multi-slot PDCCH monitoring capability, the slot(s) that is only configured with CAT-2 search space sets are dropped until the pattern of the remaining slots can satisfy the slot pattern of the multi-slot PDCCH monitoring capability. Alternatively, the slot(s) can be dropped in the following order until the pattern of the remaining slots can satisfy the slot pattern of the multi-slot PDCCH monitoring capability: a slot that is only configured with CAT-2 search space sets, a slot that is configured with both CAT-1 and CAT-2 search space sets.

Figure 6:
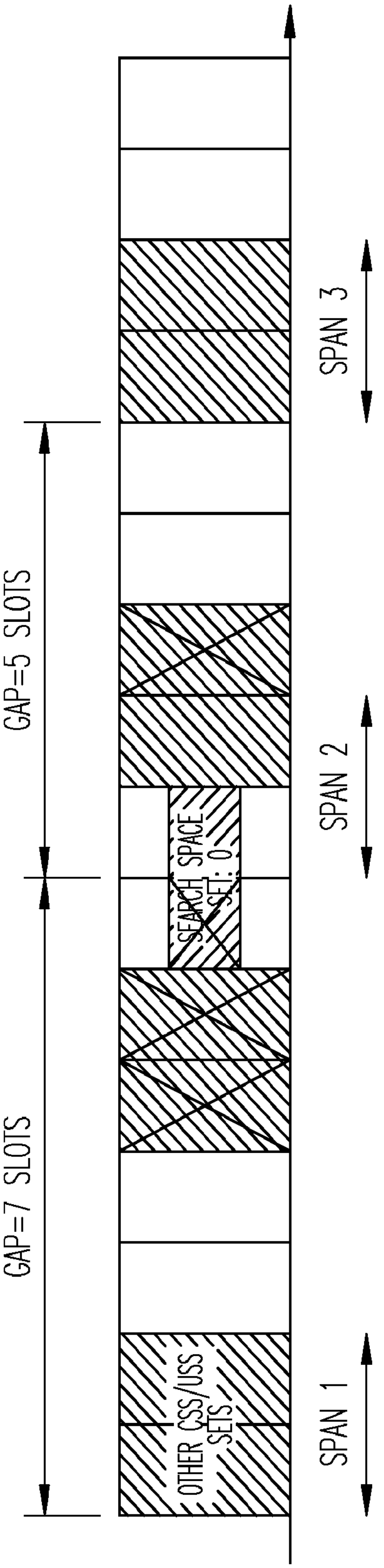
FIG. 6 illustrates an example of dropping one slot configured with search space set 0, then slot(s) configured with search space sets other than search space set 0, assuming the second option of multi-slot PDCCH monitoring capability combination (X, Y) is used, in accordance with some embodiments.

FIG. 6 shows an example of dropping one slot configured with search space set 0, then slot(s) configured with search space sets other than search space set 0, assuming the second option of multi-slot PDCCH monitoring capability combination (X, Y) is used. It is assumed that the minimum gap X between two spans is 4 and the maximum length of a span Y is 2. The first slot configured search space set 0 is dropped first, then two earlier slots and one later slot that are configured with search space sets other than search space set 0 have to be dropped, to maintain the slot gap that is not less than 4 slots. FIG. 6 shows dropping one slot configured with search space set 0 then other search space sets.

Figure 7:
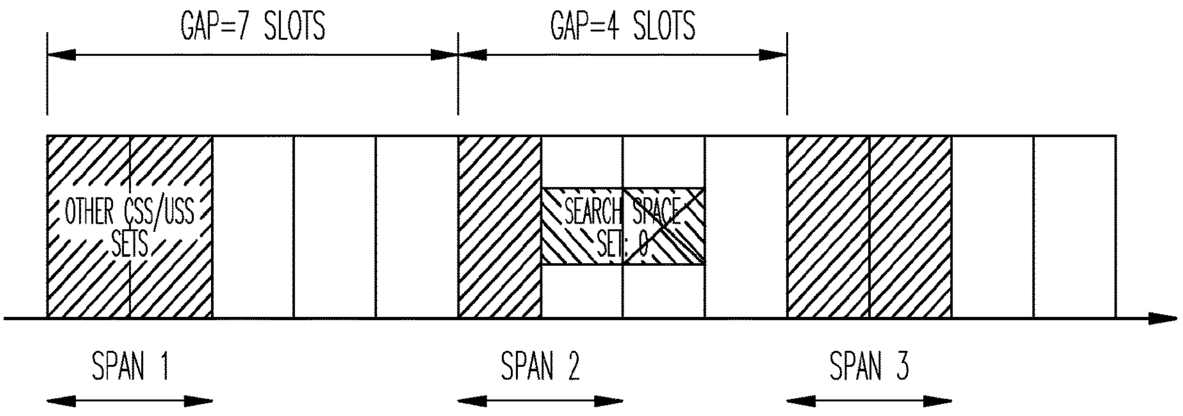
FIG. 7 illustrates an example to determine starting slot of a span based on slots configured with at least a search space set other than search space set 0, assuming the second option of multi-slot PDCCH monitoring capability combination (X, Y) is used, in accordance with some embodiments.

In one option, for the second option of multi-slot PDCCH monitoring capability combination (X, Y), the span pattern is temporarily defined by all configured CAT-2 search space sets. Then, a slot that is only configured with CAT-1 search space set is dropped, if adding the slot results in a slot pattern that doesn't satisfy combination (X, Y). Otherwise, the CAT-1 search space set in the slot can be monitored. FIG. 7 shows an example to determine starting slot of a span based on slots configured with at least a search space set other than search space set 0, assuming the second option of multi-slot PDCCH monitoring capability combination (X, Y) is used. It is assumed that the minimum gap X between two spans is 4 and the maximum length of a span Y is 2. The second slot with search space set 0 is dropped so that to make the span 2 valid. FIG. 7 shows a span that starts from slot with search space set other than search space set 0.

Figure 8:
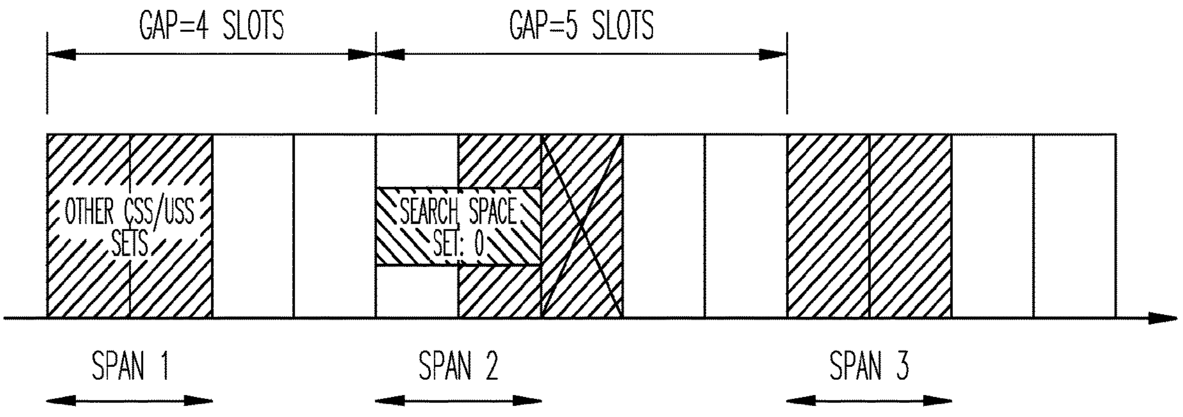
FIG. 8 illustrates an example to determine starting slot of a span based on any slot configured a search space set, assuming the second option of multi-slot PDCCH monitoring capability combination (X, Y) is used, in accordance with some embodiments.

In one option, for the second option of multi-slot PDCCH monitoring capability combination (X, Y), the starting slot of a span is defined by a first slot that is configured with any search space set. Then, any slot configured with a search space set that is Y slot after the starting slot is dropped. The next span can start from X slot after the span at earliest. FIG. 8 shows an example to determine starting slot of a span based on any slot configured a search space set, assuming the second option of multi-slot PDCCH monitoring capability combination (X, Y) is used. It is assumed that the minimum gap X between two spans is 4 and the maximum length of a span Y is 2. The second span start from the first slot configured with search space set 0 and the slot after the second slot configured with search space set 0 is dropped so that to make the span 2 valid. FIG. 8 shows a span that starts from any slot with search space set.

In one embodiment, gNB may configure extra PDCCH monitoring occasions for a CAT-2 search space set in slots other than the Y slots that UE can monitored based on the multi-slot PDCCH monitoring capability. That is, it relies on dropping one or multiple slots for the CAT-2 search space sets to satisfy the slot pattern of the multi-slot PDCCH monitoring capability (X, Y). The configured MOs of the SS set within the Y slots in a X-slot group can be actually monitored by the UE. The remaining MOs outside the Y slots are not monitored. The MOs of the SS set can be configured in the X slots in a X-slot group. The MOs of the SS set in the X slots can be configured by a bitmap of 14X bits, which enables the configuration of MO from any symbol in the X slots. Alternatively, certain compression can be considered. If the MO of the SS set can only start from a fixed symbol, e.g., symbol 0 in a slot, the configuration can be reduced to X bits. Further, MOs of the SS set in each slot can be same, i.e., monitoringSymbolsWithinSlot is commonly applied for all the Y slots within X-slot group, and X bits may indicate which slot in X slots are configured with MOs. If the MO of the SS set can only start from up to two fixed symbols, e.g., symbol 0 and/or 7 in a slot, the configuration can be reduced to 2 bits.

In one option, a PDCCH monitoring occasion of the CAT-2 search space set is valid for PDCCH monitoring when the PDCCH monitoring occasion is mapped within the Y slots of the X-slot group for the first option of multi-slot PDCCH monitoring capability (X, Y). When the CAT-1 search space changes, e.g., due to the change of SSB for the UE, the position of the Y slots in the X-slot group can change accordingly. Specifically, the configured MOs in the X slots that are in the new Y slots can be monitored by UE.

In one option, the N lowest slots that are configured with PDCCH monitoring occasions of the CAT-2 search space set and located within the Y slots of the X-slot group for the first option of multi-slot PDCCH monitoring capability are valid for PDCCH monitoring (X, Y). N can be predefined or configured by high layer signaling, e.g., N=1.

FIG. 4C shows an example to generate the valid PDCCH monitoring occasion for a CAT-2 search space set based on the slot pattern of the multi-slot PDCCH monitoring capability (X, Y), if X equals to 8 and Y equals to 4. It is assumed that the CAT-2 search space set is configured to be monitored in all slots in a X-slot group. FIG. 4C illustrates slot pattern 402, slot pattern 404 and slot pattern 406. In slot pattern 402, it assumes a slot of CAT-2 search space set that is located within the Y=4 slots in the slot group with X=8 is valid for PDCCH monitoring. Consequently, the CAT-2 search space set has effectively periodicity of 8 slots, slot offset of 1 slot and duration of 4 slots. In slot pattern 404, it assumes that only the first slot of CAT-2 search space set that is overlapped with the Y=4 slots in the slot group with X=8 is valid for PDCCH monitoring. Consequently, the CAT-2 search space set has effectively periodicity of 8 slots, slot offset of 1 slot and duration of 1 slot. If the SSB of the UE is changed, the Y slots for CAT-2 search space set may change to a new position in the X-slot group accordingly, which is shown in slot pattern 406. Since CAT-2 search space set is configured in all slots in a X-slot group, a slot of CAT-2 search space set that is located within the new Y=4 slots in the slot group with X=8 is still valid for PDCCH monitoring. Consequently, the CAT-2 search space set has effectively periodicity of 8 slots, duration of 4 slots, but with offset of 3 slots. FIG. 4C illustrates valid PDCCH monitoring occasion for a search space set based on the Y slots.

In one option, in the beam failure recovery procedure, gNB may configure a recovery search space set for the recovery operation by e.g., recovery SearchSpaceId, with extra PDCCH monitoring occasions in slots other than the Y slots that UE can monitor based on the multi-slot PDCCH monitoring capability. For example, the recovery search space set can be configured with PDCCH monitoring in all X slots in a X-slot group. When the CAT-1 search space changes, e.g., due to the change of SSB for the UE, the position of the Y slots in the X-slot group can change accordingly. By this scheme, the recovery search space set is still valid for scheduling since the recovery search space set still overlaps with the new Y slots in the X-slot group.

In another option, during the beam failure recovery procedure, UE may determine the Y slots in the X-slot group for the first option of multi-slot PDCCH monitoring capability according to the recovery search space set only. Alternatively, UE may still follow the Y slots in X-slot group before starting beam failure recovery procedure, assuming recovery search space set is configured within the Y slots. After the beam failure recovery procedure is completed, the UE can determine the Y slots in the X-slot group according to the configured CAT-1 and CAT-2 search space sets.

In one embodiment, the multi-slot PDCCH monitoring capability is defined so that the total numbers of monitored PDCCH candidates and non-overlapped CCEs of all configured CAT-2 search space sets in the Y slots do not exceed the corresponding maximum numbers. There is no limitation on the numbers of monitored PDCCH candidates and non-overlapped CCEs for CAT-1 search space set. Alternatively, the numbers of monitored PDCCH candidates and non-overlapped CCEs for CAT-1 search space set may be limited by some other parameters. This method requires UE to perform more PDCCH detections than the corresponding maximum numbers of the multi-slot PDCCH monitoring capability, when CAT-1 search space set is present. However, since CAT-1 search space set, e.g., Type 0/0A/1/2 CSS sets with search space set 0 are only monitored with long cycle, e.g., 20 ms, the increase on UE complexity may be acceptable.

Multiple Values Y for the Configured SS Sets

In the first option of multi-slot PDCCH monitoring capability, the CAT-1 search space sets are monitored in Y2 consecutive slots in a X-slot group, while the CAT-2 search space sets are monitored in Y consecutive slots in the X-slot group. Y can be different from Y2. The above Y slots and Y2 slots are overlapped. The maximum number of slots for PDCCH monitoring is max(Y, $Y_2$). In some embodiments, Y2 is smaller than X. In some other embodiments, Y2 may equal to X. If Y2 equal to X, there is no limitation on the configuration of MOs for the CAT-1 search space sets. In some other embodiments, Y2 could be 2 if the search space set 0 for a SSB is configured in two adjacent slots. in some other embodiments, if search space set 0 for a SSB is configured in two slots n0 and n0+X, Y2 can equal to 1.

The above Y2 consecutive slots include the slot(s) of search space set 0. The Y2 slots may include other slot(s) than that of search space set 0 too. If CAT-1 search space sets include search space set 0 and other search space sets, the other search space sets of CAT-1 are only monitored in the Y2 slots by UE. On the other hand, the other search space sets of CAT-2 are only monitored in the above Y consecutive slots by UE. The position of the Y slots in a X-slot group can be determined by the position of the Y2 slots in the X-slot group.

The above Y2 consecutive slots may be across the boundary of two X-slot groups. In such case, UE may only monitor the PDCCH MOs of CAT-1 search space sets in the former or the later X-slot group. Alternatively, UE may monitor the PDCCH MOs of CAT-1 search space sets in the Y2 slots across the two X-slot groups.

In one embodiment, with a limitation on the numbers of monitored PDCCH candidates and non-overlapped CCEs, it is allowed that the combined pattern of slots configured with search space sets around a slot configured with CAT-1 search space set does not satisfy the slot pattern for CAT-2 search space sets according to the first option of the multi-slot PDCCH monitoring capability, if Y2 is larger than Y. If CAT-1 search space set is not present with a X-slot group, the search space sets can only be configured in the Y slots in the X-slot group. Otherwise, if CAT-1 search space set is present with a X-slot group, it is not restricted that the CAT-1 search space sets can only be configured in the Y slots in the X-slot group. Alternatively, it may be limited that the CAT-1 search space set can only be configured in Y2 slots, e.g., the first Y2 slots in the X-slot group. $Y_2$ is predefined or configured by high layer signaling, $Y<Y_2\leq X$. The Y2 slots can be a super set of the Y slots. Alternatively, The Y2 slots can be a subset of the Y slots. It may be limited that the CAT-2 search space sets can only be configured in the Y slots in any X-slot group.

Denote the maximum numbers of monitored PDCCH candidates and non-overlapped CCEs in the X-slot group as M1 and C1 respectively, if the search space sets are only configured in the Y slots of the X-slot group. Denote the maximum numbers of monitored PDCCH candidates and non-overlapped CCEs in the X-slot group as M2 and C2 respectively, if the CAT-1 search space set are configured outside the Y slots of the X-slot group. The maximum numbers in a X-slot group may be unchanged irrespectively of the presence of CAT-1 search space set or not, i.e. $M_1=M_2$, $C_1=C_2$. Alternatively, M1, C1, M2 and C2 may be defined as separately UE capability or may be predefined separately.

Alternatively, denote the maximum numbers of monitored PDCCH candidates and non-overlapped CCEs in the X-slot group as M1 and C1 respectively, if the CAT-1 search space set is not configured in the X-slot group. Denote the maximum numbers of monitored PDCCH candidates and non-overlapped CCEs in the X-slot group as M2 and C2 respectively, if the CAT-1 search space set is configured in the X-slot group. The maximum numbers of a X-slot group may be unchanged irrespectively of the presence of CAT-1 search space set or not, i.e. $M_1=M_2$, $C_1=C_2$. Alternatively, M1, C1, M2 and C2 may be defined as separately UE capability or may be predefined separately.

Figure 9A:
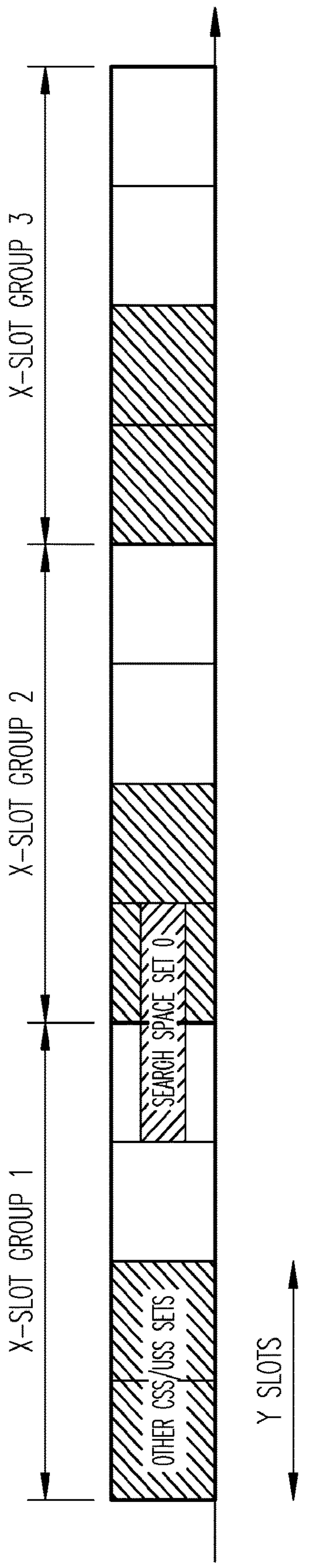
FIG. 9A illustrates an example that the slot(s) with configured search space sets are not restricted to the Y slots in the X-slot group if search space set 0 is present in a slot in the X-slot group, in accordance with some embodiments.

FIG. 9A shows an example that the slot(s) with configured search space sets are not restricted to the Y slots in the X-slot group if search space set 0 is present in a slot in the X-slot group. It is assumed that X equals to 4 and Y equals to 2. Due to the presence of search space set 0, it is allowed that the first, second and fourth slots in the X-slot group 1 with search space set 0 can be configured with PDCCH monitoring. FIG. 9A shows no restriction of Y slots if search space set 0 is present in a X-slot group.

In one embodiment, for the first option of the multi-slot PDCCH monitoring capability, if Y is different from Y2, there can be multiple candidate positions of the Y slots in the X-slot group for CAT-2 search space sets once the position of the Y2 slots in the X-slot group for CAT-1 search space sets is determined. FIG. 4B can be considered as the case with Y2=2. Therefore, after determination of the Y2=2 slots for CAT-1 search space sets, there are still three candidates of the Y slots in the X-slot group to accommodate CAT-2 search space sets, i.e., position 1, 2 or 3.

In one option, if multiple positions of the Y slots in the X-slot group can be determined by the Y2 slots, an active position of the Y slots can be determined by a rule, e.g., the position with lowest or highest starting slot of the Y slots in the X-slot group.

In one option, if multiple positions of the Y slots in the X-slot group can be determined by the Y2 slots, an active position of the Y slots can be determined by the slots with CAT-2 search space sets.

In one embodiment, gNB may configure extra PDCCH monitoring occasions for a search space set in slots other than the Y or Y2 slots that UE can monitored based on the multi-slot PDCCH monitoring capability. The configured MOs of the SS set within the Y or Y2 slots in a X-slot group can be actually monitored by the UE. The remaining MOs outside the Y or Y2 slots are not monitored.

In one option, the MOs of the SS set can be configured in the X slots in a X-slot group. The configured MOs apply to each X-slot group repeatedly. The MOs of the SS set in the X slots can be configured by a bitmap of 14Y bits, which enables the configuration of MO from any symbol in the X slots. Alternatively, certain compression can be considered. If the MO of the SS set can only start from a fixed symbol, e.g., symbol 0 in a slot, the configuration can be reduced to X bits. Further, MOs of the SS set in each slot can be same, i.e., monitoringSymbolsWithinSlot is commonly applied for all the Y slots within X-slot group, and X bits may indicate which slot in X slots are configured with MOs. If the MO of the SS set can only start from up to two fixed symbols, e.g., symbol 0 and/or 7 in a slot, the configuration can be reduced to 2X bits. When the position of Y2 slots changes, e.g., due to the change of SSB for the UE, the position of the Y slots in the X-slot group can change accordingly. Specifically, the configured MOs in the X slots that are in the new Y or Y2 slots can still be monitored by UE.

In one option, the MOs of the SS set can be configured in P consecutive slots which contains one or multiple X-slot groups. The configured MOs apply to every P consecutive slots repeatedly. For example, P equal to 8, which is the length of parameter inOneGroup in the ssb-PositionsInBurst configured by SIB1 as defined in 3GPP TS 38.331. For example, the MOs in the P consecutive slots may be indicated by a bitmap of length 14P, P or 2P.

```
ssb-PositionsInBurst          SEQUENCE {
   inOneGroup                    BIT STRING (SIZE (8)),
   groupPresence                 BIT STRING (SIZE (8))
OPTIONAL -- Cond FR2-Only
   },
```

Though gNB can transmit an arbitrary subset of SSBs, there is a limitation on the indicated SSBs by ssb-PositionsInBurst in SIB1. In every group of 8 consecutive SSBs, the same pattern of transmitted SSBs is indicated by inOneGroup. With this option, the configured MOs for a search space set can be aligned with the search space set 0 associated with the indicated SSBs by ssb-PositionsInBurst in SIB1. That is, assuming the search space set 0 is determined in slot offset no in a X-slot group for the k_th SSB, the k_th MO for the search space set can be configured in the same slot offset no in the X-slot group. This property is especially useful for the configuration of Type0A/2 CSS sets with search space set non-zero. Without change of the existing high layer procedure for paging and SI update in 3GPP TS 38.304 and 38.331, the MO to monitoring DCI for paging or for other system information for a SSB can be in a same slot offset in the X-slot group as the MO to monitoring search space set 0 for the same SSB. Therefore, no matter the SSB for the UE changes or not, UE can monitor both search space set 0 and Type0A/2 CSS sets in the same Y2 slots in the X-slot group.

Figure 9B:
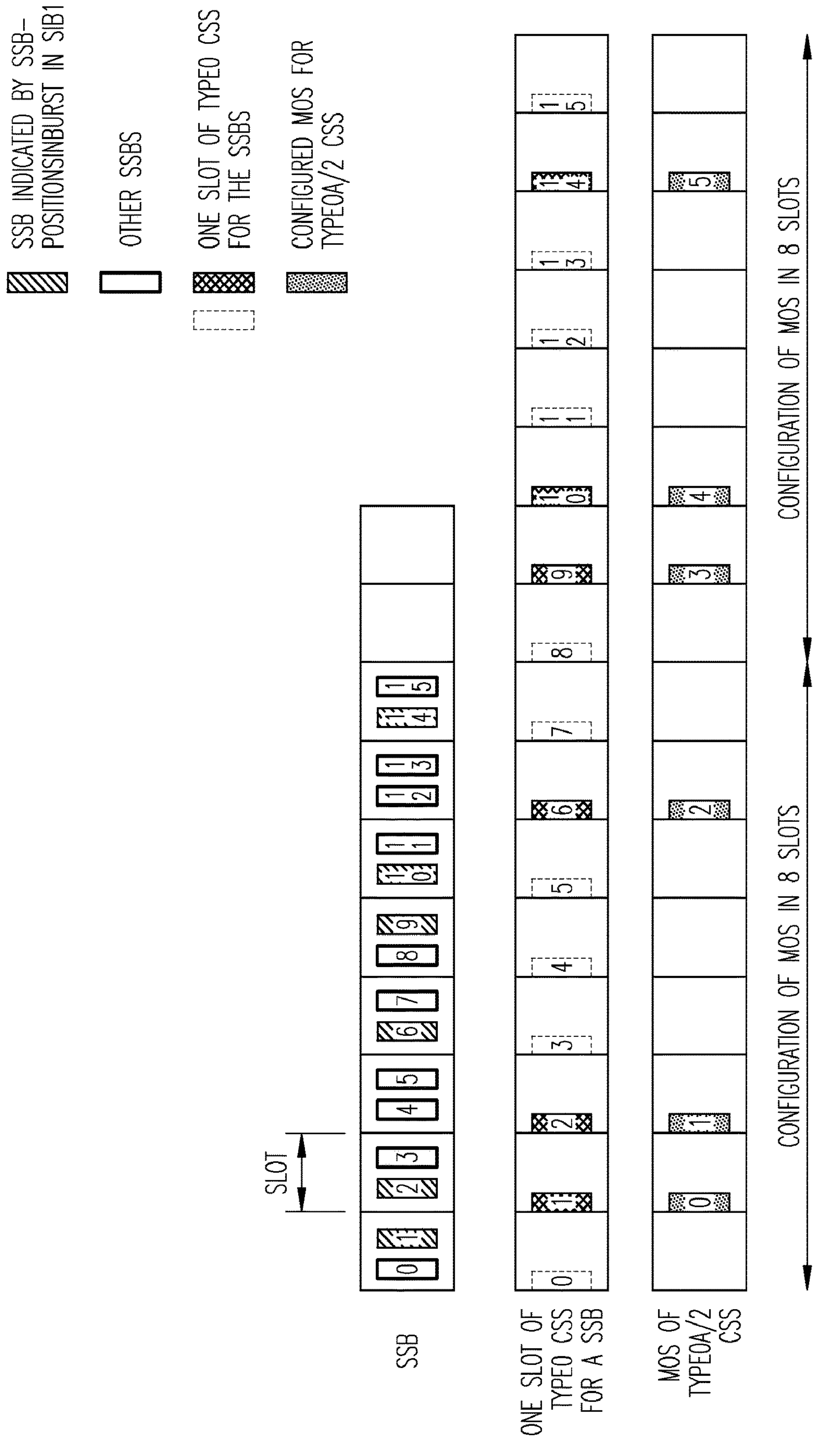
FIG. 9B an example for Type0A/2 CSS set configuration to align with the slot for Type0 CSS set in a X-slot group, in accordance with some embodiments.

FIG. 9B shows an example for Type0A/2 CSS set configuration to align with the slot for Type0 CSS set in a X-slot group. It assumes that 6 SSBs are indicated by ssb-PositionsInBurst in SIB1 and divided into two groups. Each group of 3 SSBs are indicated by inOneGroup, i.e., ‘01100010’. The 3 SSBs of each group are in the same positions inside a group. It is assumed that a slot carrying Type0 CSS set that associates with consecutive SSB index are mapped to consecutive slots. For example, such mapping can be determined by 'M=1' in Table 13-12 of TS 38.213 section 13. Finally, since only 3 transmitted SSBs are indicated by inOneGroup of ssb-PositionsInBurst in SIB1, the bitmap can just indicate 3 MOs for Type0A/2 CSS sets in 8 slots. gNB may configure the three MOs to align with the Type0 CSS sets of the same SSBs. FIG. 9B shows a Type0A/2 CSS set configuration.

Further, assuming the MOs of the SS set that are configured in P consecutive slots are aligned with transmitted SSBs that is indicated by parameter inOneGroup in the ssb-PositionsInBurst in SIB1, the MOs of the SS set configured in P consecutive slots can be indicated by inOneGroup. In other words, the MOs in M·P consecutive slots can be omitted in the SS set configuration.

In one option, the MOs of the SS set can be configured in M·P consecutive slots which are mapped to one or multiple X-slot groups. The configured MOs apply to every M·P consecutive slots repeatedly. M can be ½, 1 or 2 depending on the indicated parameter for SS/PBCH block and CORESET multiplexing pattern 1 in TS 38.213. P equal to 8, which is the length of parameter inOneGroup in the ssb-PositionsInBurst configured by SIB1 as defined in 3GPP TS 38.331. When M is ½, 1 or 2, the associated search space set 0 for a group of 8 SSBs indicated by inOneGroup are in M·P consecutive slots, i.e., 4, 8 or 16 slots. For example, to match with the up to P SSBs indicated by inOneGroup, the MOs in the M·P consecutive slots may be indicated by a bitmap of length P. The configured MOs for a search space set can be aligned with the search space set 0 associated with the indicated SSBs by ssb-PositionsInBurst in SIB1. This property is especially useful for the configuration of Type0A/2 CSS sets with search space set non-zero.

Further, assuming the MOs of the SS set that are configured in M·P consecutive slots are aligned with transmitted SSBs that is indicated by parameter inOneGroup in the ssb-PositionsInBurst in SIB1, the MOs of the SS set configured in M·P consecutive slots can be indicated by inOneGroup. In other words, the MOs in M·P consecutive slots can be omitted in the SS set configuration.

In one option, the MOs of a SS set that are associated with the SSBs indicated by ssb-PositionsInBurst in SIB1 can be allocated in one or multiple consecutive blocks. Here, each block maps to K X-slot groups. K can be predefined, configured by a parameter in the SS set configuration, or configured separately by a high layer signaling. for example, K equals to 1. Alternatively, each block has M·P consecutive slots which are mapped to one or multiple X-slot groups. The blocks are consecutive and non-overlapping. The blocks of the SS set can be configured by high layer signaling, e.g., by parameter monitoringSlotPeriodicityAndOffset and duration. Each block contains the MOs for N transmitted SSBs indicated by ssb-PositionsInBurst in SIB1. Or, each block contains the MOs for up to N transmitted SSBs indicated by ssb-PositionsInBurst in SIB1. The exact number of MOs in a block should guarantee that the MOs for the SSBs are allocated in the order of the SSBs. The N MOs or up to N MOs in a block are respectively configured in the same slot offset(s) in a X-slot group as the search space set 0 associated with the N SSBs or up to N SSBs indicated by ssb-PositionsInBurst in SIB1. N can be predefined, configured by a parameter in the SS set configuration, or configured separately by a high layer signaling.

Figure 9C:
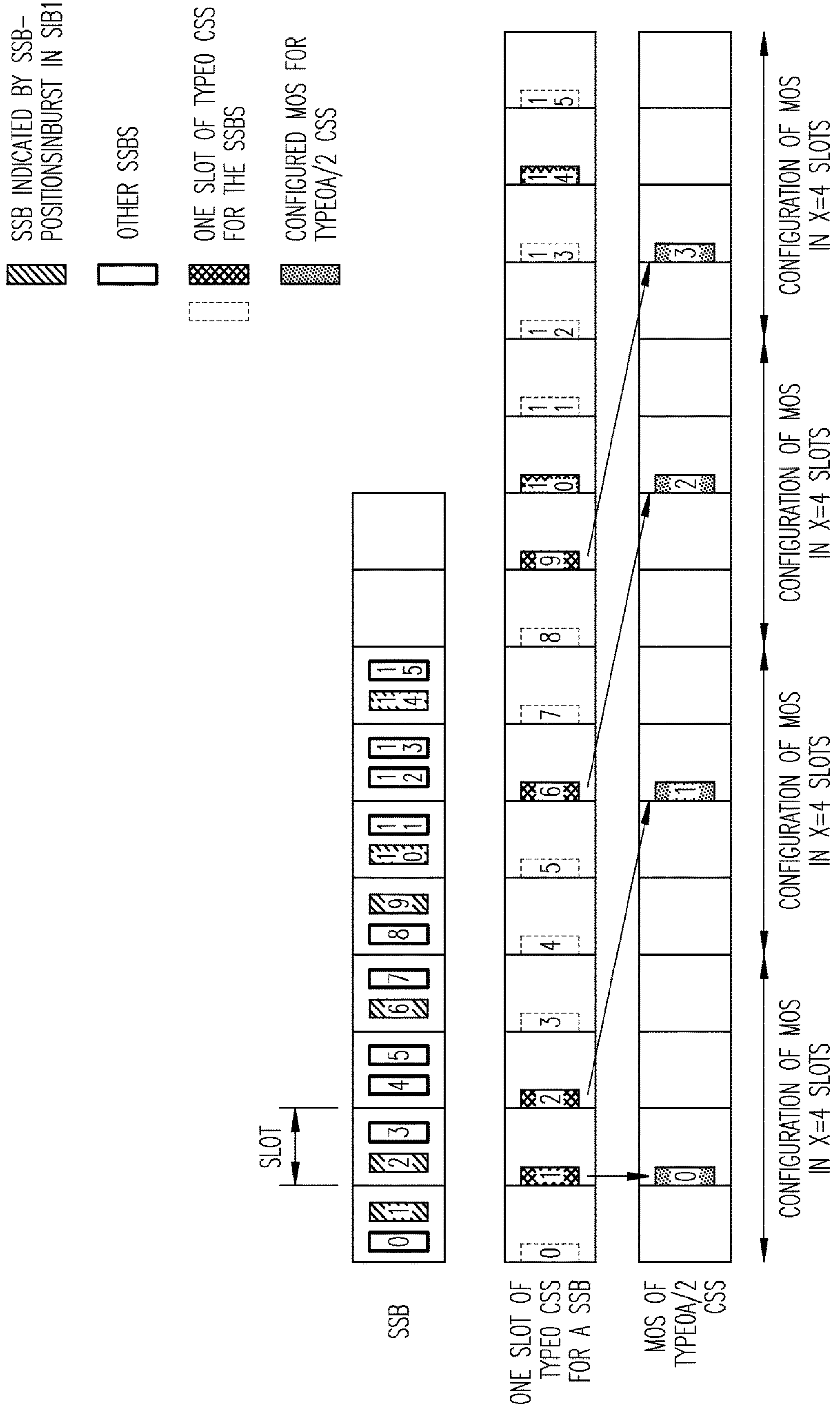
FIG. 9C illustrates an example for Type0A/2 CSS set configuration with one MO per X slots which aligns with the slot for Type0 CSS set in a X-slot group, in accordance with some embodiments.

FIG. 9C shows an example for Type0A/2 CSS set configuration with one MO per X slots which aligns with the slot for Type0 CSS set in a X-slot group. It uses the same assumptions as FIG. 9B. MO 0 is allocated in the first X-slot group and has a slot offset 1 which aligns the search space set 0 of the first SSB indicated by ssb-PositionsInBurst in SIB1. MO k is allocated in the second X-slot group and has a slot offset 2 which aligns the search space set 0 of the second SSB indicated by ssb-PositionsInBurst in SIB1, etc. FIG. 9C shows one MO per X-slot group which links to SSB.

In another option, the MOs of the SS set can be configured in the Y or Y2 slots in a X-slot group. The configured MOs apply to each X-slot group repeatedly. The MOs of the SS set in the Y or Y2 slots can be configured by a bitmap of 14Y or $14Y_2$ bits, which enables the configuration of MO from any symbol in the Y or Y2 slots. Alternatively, certain compression can be considered. If the MO of the SS set can only start from a fixed symbol, e.g., symbol 0 in a slot, the configuration can be reduced to Y or Y2 bits. Further, MOs of the SS set in each slot can be same (i.e., monitoringSymbolsWithinSlot is commonly applied for all the Y or Y2 slots within X-slot group), and Y or Y2 bits may indicate which slot in Y or Y2 slots are configured with MOs. If the MO of the SS set can only start from up to two fixed symbols, e.g., symbol 0 and/or 7 in a slot, the configuration can be reduced to 2Y or $2Y_2$ bits. When the position of Y2 slots changes, e.g., due to the change of SSB for the UE, the position of the Y slots in the X-slot group can change accordingly. Accordingly, the configured MOs in the Y or Y2 slots of a SS set can shift to the new position of Y or Y2 slots in a X-slot group.

The different options may be used for different types of search space sets.

In some embodiments, for Type0A/2 CSS sets with search space set non-zero, the MOs can be configured in P or M·P consecutive slots which are mapped to one or multiple X-slot groups. For all other search space set except search space set 0, the MOs can be configured in X slots in a X-slot group.

In some other embodiments, for Type0A/2 CSS sets with search space set non-zero, the MOs can be configured in P or M·P consecutive slots which are mapped to one or multiple X-slot groups. For Type1 CSS sets with search space set non-zero and Type3 CSS sets, the MOs can be configured in X slots in a X-slot group. For USS sets, the MOs can be configured in the Y slots in a X-slot group.

In some other embodiments, for Type0A/2 CSS sets with search space set non-zero, the MOs can be configured in P or M·P consecutive slots which are mapped to one or multiple X-slot groups. For Type1 CSS sets with search space set non-zero and Type3 CSS sets, the MOs can be configured in the Y2 slots in a X-slot group. For USS sets, the MOs can be configured in the Y slots in a X-slot group.

In some other embodiments, for Type0A/2 CSS sets with search space set non-zero, the MOs can be configured in P or M·P consecutive slots which are mapped to one or multiple X-slot groups. For Type1 CSS sets with search space set non-zero, the MOs can be configured in X slots in a X-slot group. For Type3 CSS sets and USS sets, the MOs can be configured in the Y slots in a X-slot group.

In some other embodiments, for Type0A/2 CSS sets with search space set non-zero, the MOs can be configured in P or M·P consecutive slots which are mapped to one or multiple X-slot groups. For Type1 CSS sets with search space set non-zero, the MOs can be configured in the Y2 slots in a X-slot group. For Type3 CSS sets and USS sets, the MOs can be configured in the Y slots in a X-slot group.

In some other embodiments, for Type0A/2 CSS sets with search space set non-zero, the MOs can be configured in P or M·P consecutive slots which are mapped to one or multiple X-slot groups. For Type1 CSS sets with search space set non-zero without dedicated RRC configuration, the MOs can be configured in X slots in a X-slot group. For Type1 CSS sets with dedicated RRC configuration, Type3 CSS sets and USS sets, the MOs can be configured in the Y slots in a X-slot group.

In some other embodiments, for Type0A/2 CSS sets with search space set non-zero, the MOs can be configured in P or M·P consecutive slots which are mapped to one or multiple X-slot groups. For Type1 CSS sets with search space set non-zero without dedicated RRC configuration, the MOs can be configured in the Y2 slots in a X-slot group. For Type1 CSS sets with dedicated RRC configuration, Type3 CSS sets and USS sets, the MOs can be configured in the Y slots in a X-slot group.

In some other embodiments, for Type0A/2 CSS sets with search space set non-zero, the MOs can be configured in P or M·P consecutive slots which are mapped to one or multiple X-slot groups. For all other search space set except search space set 0, the MOs can be configured in the Y slots in a X-slot group.

In one embodiment, with a limitation on the numbers of monitored PDCCH candidates and non-overlapped CCEs, it is allowed that the combined pattern of slots configured with search space sets around a slot configured with CAT-1 search space set does not satisfy the slot pattern of the second option of the multi-slot PDCCH monitoring capability combination (X, Y).

Alternatively, if the combined pattern of slots configured with search space sets does not satisfy the slot pattern of combination (X, Y), one slot that is only configured with CAT-1 search space is dropped firstly. Preferably, if the pattern of the remaining slots after dropping a slot that is configured with CAT-1 search space set can satisfy the slot pattern of the multi-slot PDCCH monitoring capability, the slot is dropped. Alternatively, a slot that is only configured with CAT-1 search space set with lower slot index or higher slot index is dropped. Then, it is allowed that the remaining slots with configured search space sets around a slot configured with CAT-1 search space set does not satisfy the slot pattern of combination (X, Y), with a limitation on the numbers of monitored PDCCH candidates and non-overlapped CCEs.

In one option, for the second option of multi-slot PDCCH monitoring capability combination (X, Y), the span pattern is temporarily defined by slots configured with CAT-2 search space sets. Then, it is allowed that one or more slots between the starting slots, $s_1$, $s_2$ of two adjacent spans are configured with CAT-1 search space sets. The slot(s) configured with CAT-1 search space set can be any slot from slot $s_1$ to $s_2-1$. Alternatively, the slot configured with CAT-1 search space set can be any slot from slot $s_1$ to $s_1+Y_2-1$. $Y_2$ is predefined or configured by high layer signaling, $Y<Y_2\leq X$.

Figure 10:
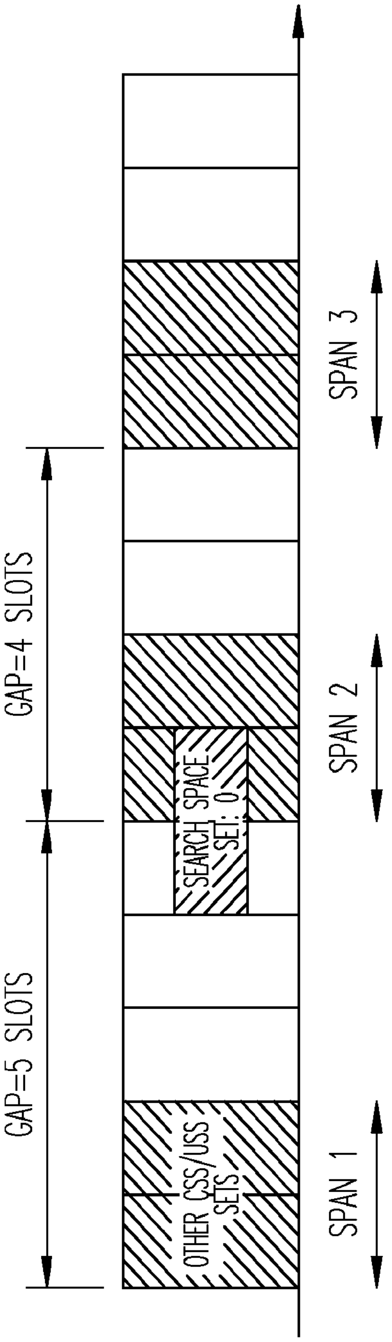
FIG. 10 illustrates an example to determine starting slot of a span based on slots configured with at least a search space set other than search space set 0, assuming the second option of multi-slot PDCCH monitoring capability combination (X, Y) is used, in accordance with some embodiments.

FIG. 10 shows an example to determine starting slot of a span based on slots configured with at least a search space set other than search space set 0, assuming the second option of multi-slot PDCCH monitoring capability combination (X, Y) is used. It is assumed that the minimum gap X between two spans is 4 and the maximum length of a span Y is 2. The search space set 0 in the slot before the starting slot of span 2 can be monitored by UE. The maximum number of monitored PDCCH candidates and non-overlapped CCEs applies to PDCCH monitoring in the 5 slots between the starting slots of span 1 and span 2. FIG. 10 shows a span that starts from slot with search space set other than search space set 0.

In another option, for the second option of multi-slot PDCCH monitoring capability combination (X, Y), the starting slot of a span is defined by a first slot that is configured with any search space set. Then, the next span can start from X slot after the span at earliest. Denote the starting slots of two adjacent spans as $s_1$, $s_2$, it is allowed the search space sets to be configured in any slot from slot $s_1$ to $s_2-1$. Alternatively, it is allowed the search space sets to be configured in any slot from slot $s_1$ to $s_1+Y_2-1$. $Y_2$ is predefined or configured by high layer signaling, $Y<Y_2\leq X$.

Figure 11:
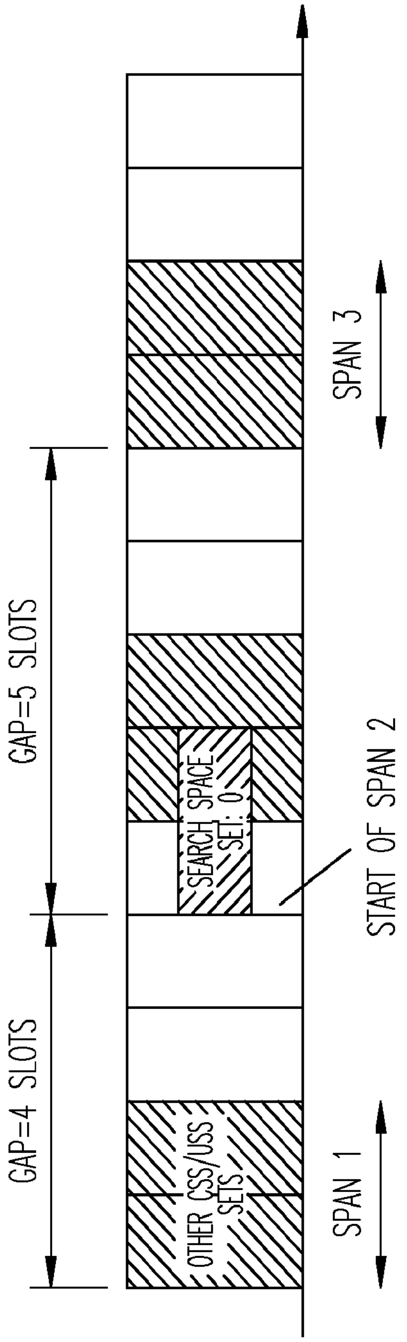
FIG. 11 illustrates an example to determine starting slot of a span based on any slot configured a search space set, assuming the second option of multi-slot PDCCH monitoring capability combination (X, Y) is used, in accordance with some embodiments.

FIG. 11 shows an example to determine starting slot of a span based on any slot configured a search space set, assuming the second option of multi-slot PDCCH monitoring capability combination (X, Y) is used. It is assumed that the minimum gap X between two spans is 4 and the maximum length of a span Y is 2. The gap between span 1 and span 2 is 4 slots. The span 2 start from the first slot configured with search space set 0. PDCCH monitoring can be done in 3 consecutive slots from the first slot configured with search space set 0. The gap between span 1 and span 2 is 4 slots. The gap between span 2 and span 3 is 5 slots. FIG. 11 shows a span that starts from any slot with search space set.

For the second option of multi-slot PDCCH monitoring capability combination (X, Y), denote the starting slots of two adjacent spans as $s_1$, $s_2$. Denote the maximum numbers of monitored PDCCH candidates and non-overlapped CCEs as M1 and C1 respectively, if the search space sets are only configured from slot $s_1$ to $s_1+Y-1$. Further, Denote the maximum numbers of monitored PDCCH candidates and non-overlapped CCEs as M2 and C2 respectively, if a search space set is configured after slot $s_1+Y-1$ The maximum numbers may be unchanged irrespectively of the presence of CAT-1 search space set or not, i.e. $M_1=M_2$, $C_1=C_2$. Alternatively, M1, C1, M2 and C2 may be defined as separately UE capability or may be predefined separately.

Alternatively, for the second option of multi-slot PDCCH monitoring capability combination (X, Y), denote the starting slots of two adjacent spans as $s_2$, $s_2$ Denote the maximum numbers of monitored PDCCH candidates and non-overlapped CCEs as M1 and C1 respectively, if the CAT-1 search space set is not within slot $s_1$ to $s_2-1$. Further, Denote the maximum numbers of monitored PDCCH candidates and non-overlapped CCEs as M2 and C2 respectively, if the CAT-1 search space set is configured within slot $s_1$ to $s_2-1$ The maximum numbers may be unchanged irrespectively of the presence of CAT-1 search space set or not, i.e. $M_1=M_2C_1=C_2$. Alternatively, M1, C1, M2 and C2 may be defined as separately UE capability or may be predefined separately.

Figure 12:
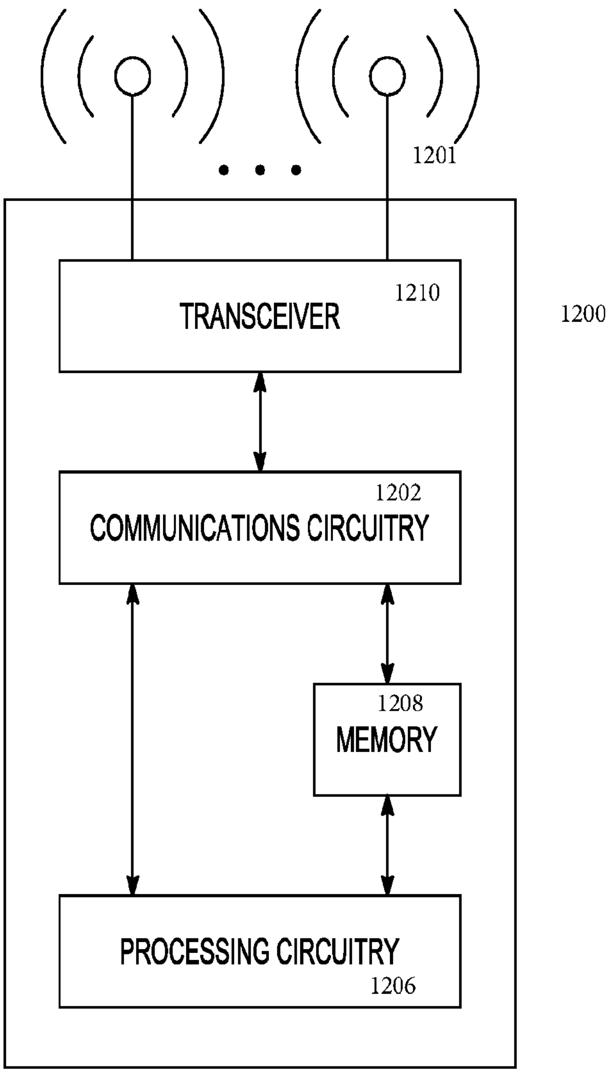
FIG. 12 illustrates a functional block diagram of a wireless communication device, in accordance with some embodiments.

FIG. 12 illustrates a functional block diagram of a wireless communication device, in accordance with some embodiments. Wireless communication device 1200 may be suitable for use as a UE or gNB configured for operation in a 5G NR network.

The communication device 1200 may also be suitable for use as a handheld device, a mobile device, a cellular telephone, a smartphone, a tablet, a netbook, a wireless terminal, a laptop computer, a wearable computer device, a femtocell, a high data rate (HDR) subscriber device, an access point, an access terminal, or other personal communication system (PCS) device.

The communication device 1200 may include communications circuitry 1202 and a transceiver 1210 for transmitting and receiving signals to and from other communication devices using one or more antennas 1201. The communications circuitry 1202 may include circuitry that can operate the physical layer (PHY) communications and/or medium access control (MAC) communications for controlling access to the wireless medium, and/or any other communications layers for transmitting and receiving signals. The communication device 1200 may also include processing circuitry 1206 and memory 1208 arranged to perform the operations described herein. In some embodiments, the communications circuitry 1202 and the processing circuitry 1206 may be configured to perform operations detailed in the above figures, diagrams, and flows.

In accordance with some embodiments, the communications circuitry 1202 may be arranged to contend for a wireless medium and configure frames or packets for communicating over the wireless medium. The communications circuitry 1202 may be arranged to transmit and receive signals. The communications circuitry 1202 may also include circuitry for modulation/demodulation, upconversion/downconversion, filtering, amplification, etc. In some embodiments, the processing circuitry 1206 of the communication device 1200 may include one or more processors. In other embodiments, two or more antennas 1201 may be coupled to the communications circuitry 1202 arranged for sending and receiving signals. The memory 1208 may store information for configuring the processing circuitry 1206 to perform operations for configuring and transmitting message frames and performing the various operations described herein. The memory 1208 may include any type of memory, including non-transitory memory, for storing information in a form readable by a machine (e.g., a computer). For example, the memory 1208 may include a computer-readable storage device, read-only memory (ROM), random-access memory (RAM), magnetic disk storage media, optical storage media, flash-memory devices and other storage devices and media.

In some embodiments, the communication device 1200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 1200 may include one or more antennas 1201. The antennas 1201 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 1200 may include one or more of a keyboard, a display, a non-volatile memory port, multiple antennas, a graphics processor, an application processor, speakers, and other mobile device elements. The display may be an LCD screen including a touch screen.

Although the communication device 1200 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 1200 may refer to one or more processes operating on one or more processing elements.

EXAMPLES

Example 1 may include a method of wireless communication to handle different kinds of search space set configurations with multi-slot PDCCH monitoring capability.

Example 2 may include the method of example 1 or some other example herein, wherein if the combined pattern of slots configured with search space sets does not satisfy the slot pattern of the multi-slot PDCCH monitoring capability, UE drops the PDCCH monitoring occasions in one or more slots.

Example 3 may include the method of example 2 or some other example herein, wherein the PDCCH monitoring occasions in a slot that is only configured with CAT-1 search space set is dropped.

Example 4 may include the method of example 2 or some other example herein, wherein one or multiple slot(s) that is only configured with CAT-2 search space sets is dropped first.

Example 5 may include the method of example 2 or some other example herein, wherein one slot that is only configured with CAT-1 search space is dropped first; if the pattern of the remaining slots does not satisfy the slot pattern of the multi-slot PDCCH monitoring capability, the slot(s) that is only configured with CAT-2 search space sets are dropped.

Example 6 may include the method of example 2 or some other example herein, wherein for multi-slot PDCCH monitoring capability combination (X, Y), the span pattern is temporarily defined by all configured CAT-2 search space sets; a slot that is only configured with CAT-1 search space set is dropped, if adding the slot results in a slot pattern that doesn't satisfy combination (X, Y).

Example 7 may include the method of example 2 or some other example herein, wherein for multi-slot PDCCH monitoring capability combination (X, Y), the starting slot of a span is defined by a first slot that is configured with any search space set; any slot configured with a search space set that is Y slot after the starting slot is dropped, and the next span starts from X slot after the span at earliest.

Example 8 may include the method of example 1 or some other example herein, wherein the multi-slot PDCCH monitoring capability is defined so that the total numbers of monitored PDCCH candidates and non-overlapped CCEs of all configured CAT-2 search space sets in the Y slots do not exceed the corresponding maximum numbers.

Example 9 may include the method of example 1 or some other example herein, wherein with a limitation on the numbers of monitored PDCCH candidates and non-overlapped CCEs, the combined pattern of slots configured with search space sets around a slot configured with CAT-1 search space set does not satisfy the slot pattern of the multi-slot PDCCH monitoring capability.

Example 10 may include the method of example 9 or some other example herein, wherein CAT-1 search space set is configured in any slot within a X-slot group, in Y2 slots in a X-slot group, $Y<Y_2\leq X$.

Example 11 may include the method of example 9 or some other example herein, wherein one slot that is only configured with CAT-1 search space is dropped firstly.

Example 12 may include the method of examples 9 or 11 or some other example herein, wherein for multi-slot PDCCH monitoring capability combination (X, Y), the span pattern is temporarily defined by slots configured with CAT-2 search space sets; one or more slots between the starting slots of two adjacent spans are configured with CAT-1 search space set.

Example 13 may include the method of examples 9 or 11 or some other example herein, wherein for multi-slot PDCCH monitoring capability combination (X, Y), the starting slot of a span is defined by a first slot that is configured with any search space set; the next span starts from X slot after the span at earliest.

Example 14 may include the method of examples 9 to 13 or some other example herein, wherein the maximum numbers of monitored PDCCH candidates and non-overlapped CCEs are unchanged irrespectively of the presence of CAT-1 search space set or not.

Example 15 may include the method of examples 9 to 13 or some other example herein, wherein the maximum numbers of monitored PDCCH candidates and non-overlapped CCEs depend on the presence of CAT-1 search space set or not.

Example 16 may include a method of a UE, the method comprising: receiving a plurality of search space set configurations associated with a multi-slot PDCCH monitoring capability; determining that a combined pattern of slots configured with search space sets does not satisfy a slot pattern of the multi-slot PDCCH monitoring capability; and dropping one or more PDCCH monitoring occasions based on the determination.

Example 17 may include the method of example 16 or some other example herein, further comprising identifying, based on the slot pattern, one or more specific slots of the combined pattern of slots within which to drop the one or more PDCCH monitoring occasions.

Example 18 may include the method of example 16-17 or some other example herein, wherein the PDCCH monitoring occasions in a slot that is only configured with a CAT-1 search space set is dropped.

Example 19 may include the method of example 16-18 or some other example herein, wherein PDCCH monitoring occasions in one or more slots that is only configured with CAT-2 search space sets is dropped first.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a user equipment (UE) configured for operation in fifth-generation new radio (5G NR) network, the apparatus comprising: processing circuitry; and memory, the processing circuitry configured to:

decode higher-layer signalling for multi-slot physical downlink control channel (PDCCH) monitoring received from a gNodeB (gNB), the higher-layer signalling comprising configuration information to configure the UE with a Type1-PDCCH Common Search Space (CSS) (Type1-PDCCH CSS) set providing a PDCCH monitoring pattern that indicates monitoring occasions (MO) with a number of (Y) consecutive slots with a slot group of (X) slots of a search space set, wherein the number of (Y) consecutive slots is not larger than a number of consecutive slots indicated as a capability by the UE for monitoring; and perform the multi-slot PDCCH monitoring by monitoring the monitoring occasions for PDCCH candidates within the (Y) consecutive slots of the slot group, wherein for a subcarrier spacing (SCS) configuration of 480 KHz, the number of slots (X) of the slot group is four and the number of consecutive slots that include the monitoring occasions is either two or one, and wherein for a SCS configuration of 960 KHz, the number of slots (X) of the slot group is eight and the number of consecutive slots that include the monitoring occasions is either four or one.

2. The apparatus of claim 1, wherein the capability indicated by the UE is expressed as a combination (X, Y) of the number of slots (X) in the slot group and a number of consecutive slots (Y) for monitoring.

3. The apparatus of claim 1, wherein the processing circuitry is to configure the UE to refrain from performing the multi-slot PDCCH monitoring for SCS configurations other than the SCS configuration of 480 kHz and 960 kHz.

4. The apparatus of claim 1, wherein the processing circuitry is configured to determine a location of the (Y) consecutive slots for monitoring within the slot group from the configured Type1-PDCCH CSS set, wherein the location of the (Y) consecutive slots for monitoring within the slot group is maintained across a plurality of slot groups, and wherein a beginning of a first slot of the slot group is aligned with a subframe boundary.

5. The apparatus of claim 1, wherein the configuration information to configure the UE with the Type1-PDCCH CSS set indicates a downlink control information (DCI) format, wherein the processing circuitry is to:

perform the multi-slot PDCCH monitoring by monitoring PDCCH candidates for detection of the DCI format; and decode the DCI format, the DCI format scheduling one or multiple physical downlink shared channels (PDSCHs).

6. The apparatus of claim 2, wherein for the multi-slot PDCCH monitoring, the processing circuitry is to configure the UE to monitor for PDCCH candidates only within the consecutive slots of the number (Y) of consecutive slots of the slot group.

7. The apparatus of claim 6, wherein for the multi-slot PDCCH monitoring, the processing circuitry is to configure the UE to refrain from monitoring slots for PDCCH candidates that are not within the consecutive slots of the group of (Y) consecutive slots the slot group.

8. The apparatus of claim 7, wherein the number of slots (X) of the slot group and the number of consecutive slots that include the monitoring occasions is based on a subcarrier spacing (SCS) configuration.

9. An apparatus for a user equipment (UE) configured for operation in fifth-generation new radio (5G NR) network, the apparatus comprising: processing circuitry; and memory, the processing circuitry configured to:

decode higher-layer signalling for multi-slot physical downlink control channel (PDCCH) monitoring received from a gNodeB (gNB), the higher-layer signalling comprising configuration information to configure the UE with a Type1-PDCCH Common Search Space (CSS) (Type1-PDCCH CSS) set providing a PDCCH monitoring pattern that indicates monitoring occasions (MO) with a number of (Y) consecutive slots with a slot group of (X) slots of a search space set, wherein the number of (Y) consecutive slots is not larger than a number of consecutive slots indicated as a capability by the UE for monitoring; and perform the multi-slot PDCCH monitoring by monitoring the monitoring occasions for PDCCH candidates within the (Y) consecutive slots of the slot group, wherein the capability indicated by the UE is expressed as a combination (X, Y) of the number of slots (X) in the slot group and a number of consecutive slots (Y) for monitoring, wherein for the multi-slot PDCCH monitoring, the processing circuitry is to configure the UE to monitor for PDCCH candidates only within the consecutive slots of the number (Y) of consecutive slots of the slot group, wherein for the multi-slot PDCCH monitoring, the processing circuitry is to configure the UE to refrain from monitoring slots for PDCCH candidates that are not within the consecutive slots of the group of (Y) consecutive slots the slot group, wherein the number of slots (X) of the slot group and the number of consecutive slots that include the monitoring occasions is based on a subcarrier spacing (SCS) configuration, and wherein the number of slots (X) of the slot group is at least twice the number of consecutive slots that include the monitoring occasions for SCS configurations of 480 kHz and 960 kHz.

10. A non-transitory computer-readable storage medium that stores instructions for execution by processing circuitry for a user equipment (UE), the instructions to configure the processing circuitry to:

decode higher-layer signalling for multi-slot physical downlink control channel (PDCCH) monitoring received from a gNodeB (gNB), the higher-layer signalling comprising configuration information to configure the UE with a Type1-PDCCH Common Search Space (CSS) (Type1-PDCCH CSS) set providing a PDCCH monitoring pattern that indicates monitoring occasions (MO) with a number of (Y) consecutive slots with a slot group of (X) slots of a search space set, wherein the number of (Y) consecutive slots is not larger than a number of consecutive slots indicated as a capability by the UE for monitoring; and perform the multi-slot PDCCH monitoring by monitoring the monitoring occasions for PDCCH candidates within the (Y) consecutive slots of the slot group, wherein the number of slots (X) of the slot group and the number of consecutive slots that include the monitoring occasions is based on a subcarrier spacing (SCS) configuration, wherein for an SCS configuration of 480 KHz, the number of slots (X) of the slot group is four and the number of consecutive slots that include the monitoring occasions is either two or one, and wherein for an SCS configuration of 960 KHz, the number of slots (X) of the slot group is eight and the number of consecutive slots that include the monitoring occasions is either four or one.

11. The non-transitory computer-readable storage medium of claim 10, wherein the capability indicated by the UE is expressed as a combination (X, Y) of the number of slots (X) in the slot group and a number of consecutive slots (Y) for monitoring.

12. The non-transitory computer-readable storage medium of claim 10, wherein the number of slots (X) of the slot group is at least twice the number of consecutive slots that include the monitoring occasions for SCS configurations of 480 kHz and 960 kHz.

13. The non-transitory computer-readable storage medium of claim 10, wherein the processing circuitry is to configure the UE to refrain from performing the multi-slot PDCCH monitoring for SCS configurations other than the SCS configuration of 480 kHz and 960 kHz.

14. The non-transitory computer-readable storage medium of claim 11, wherein for the multi-slot PDCCH monitoring, the processing circuitry is to configure the UE to monitor for PDCCH candidates only within the consecutive slots of the number (Y) of consecutive slots of the slot group.

15. The non-transitory computer-readable storage medium of claim 14, wherein for the multi-slot PDCCH monitoring, the processing circuitry is to configure the UE to refrain from monitoring slots for PDCCH candidates that are not with in the consecutive slots of the group of (Y) consecutive slots the slot group.

16. An apparatus for a gNodeB (gNB), the apparatus comprising: processing circuitry; and memory, the processing circuitry is configured to:

encode higher-layer signalling to configure a user equipment (UE) for multi-slot physical downlink control channel (PDCCH) monitoring, the higher-layer signalling comprising configuration information to configure the UE with a Type1-PDCCH Common Search Space (CSS) (Type1-PDCCH CSS) set providing a PDCCH monitoring pattern that indicates monitoring occasions (MO) with a number of (Y) consecutive slots with a slot group of (X) slots of a search space set, wherein the number of (Y) consecutive slots is not larger than a number of consecutive slots indicated as a capability by the UE for monitoring; and wherein the higher-layer signalling configures the UE to perform the multi-slot PDCCH monitoring in the monitoring occasions for PDCCH candidates within the (Y) consecutive slots of the slot group, wherein for a subcarrier spacing (SCS) configuration of 480 KHz, the number of slots (X) of the slot group is four and the number of consecutive slots that include the monitoring occasions is either two or one, and wherein for the SCS configuration of 960 KHz, the number of slots (X) of the slot group is eight and the number of consecutive slots that include the monitoring occasions is either four or one.

17. The apparatus of claim 16, wherein the capability indicated by the UE is expressed as a combination (X, Y) of the number of slots (X) in the slot group and a number of consecutive slots (Y) for monitoring, and wherein for the multi-slot PDCCH monitoring, the higher-layer signalling is to configure the UE to monitor for PDCCH candidates only within the consecutive slots of the number (Y) of consecutive slots of the slot group.

* * * * *